US011157295B2

(12) United States Patent
Schur

(10) Patent No.: US 11,157,295 B2
(45) Date of Patent: Oct. 26, 2021

(54) SYSTEM AND METHOD FOR PROVIDING INTELLIGENT OPERANT OPERATING INTERFACE AND INTELLIGENT PERSONAL ASSISTANT AS A SERVICE ON A CRYPTO SECURE SOCIAL MEDIA AND CROSS BRIDGE SERVICE WITH CONTINUOUS PROSUMER VALIDATION BASED ON I-OPERANT+198 TAGS, I-BUBBLE+198 TAGS, DEMOJIS+198 AND DEMOTICONS+198

(71) Applicant: Patrick Schur, Magden (CH)

(72) Inventor: Patrick Schur, Magden (CH)

( * ) Notice: Subject to any disclaimer, the term of this patent is extended or adjusted under 35 U.S.C. 154(b) by 0 days.

(21) Appl. No.: 16/188,667

(22) Filed: Nov. 13, 2018

(65) Prior Publication Data
US 2019/0205148 A1    Jul. 4, 2019

Related U.S. Application Data

(63) Continuation-in-part of application No. 15/859,919, filed on Jan. 2, 2018.

(51) Int. Cl.
*G06F 9/451* (2018.01)
*G06Q 30/06* (2012.01)
(Continued)

(52) U.S. Cl.
CPC ............ *G06F 9/453* (2018.02); *G06F 3/0482* (2013.01); *G06F 3/0484* (2013.01);
(Continued)

(58) Field of Classification Search
CPC ......... H04L 67/20; H04L 67/12; G06Q 50/01; G06Q 30/0635; G06Q 30/0617; G06F 3/0484; G06F 3/0482; G06F 9/453
See application file for complete search history.

(56) References Cited

U.S. PATENT DOCUMENTS

2004/0049345 A1    3/2004  McDonough et al.
2007/0226032 A1    9/2007  White et al.
(Continued)

FOREIGN PATENT DOCUMENTS

| WO | 2005015404 A2 | 2/2005 |
| WO | 2017044300 A1 | 3/2017 |
| WO | 2017127850 A1 | 7/2017 |

OTHER PUBLICATIONS

Peters et al, Design for Collaboration in Mixed Reality, 2016 (Year: 2016).*
(Continued)

*Primary Examiner* — Mohamed N El-Bathy
(74) *Attorney, Agent, or Firm* — Gearhart Law LLC; David Postolski, Esq.

(57) ABSTRACT

Systems and methods are provided for providing an intelligent personal assistant as a service. The method includes opening a digital application on an electronic device, connecting one or more third party applications with the digital application within or outside of given trusting levels or authorities, determining one or more tasks to be performed using the one or more third party applications, creating one or more operants/bubbles, wherein each operant/bubble corresponds to at least one of the one or more tasks in specific supply chain sequence, selecting one or more operants/bubbles using the graphical riser interface or smart projections, and running the selected one or more operants/bubbles in a specific supply chain sequence, using the graphical user interface or smart projections, enabling control of the one or more third party applications using the digital application on users best situational channel.

20 Claims, 33 Drawing Sheets

(51) Int. Cl.
  *G06F 3/0484* (2013.01)
  *G06F 3/0482* (2013.01)
  *G06Q 50/00* (2012.01)
  *H04L 29/08* (2006.01)

(52) U.S. Cl.
  CPC ..... *G06Q 30/0617* (2013.01); *G06Q 30/0635* (2013.01); *G06Q 50/01* (2013.01); *H04L 67/12* (2013.01); *H04L 67/20* (2013.01)

(56) References Cited

U.S. PATENT DOCUMENTS

| | | | |
|---|---|---|---|
| 2013/0185368 A1 | 7/2013 | Nordstrom et al. | |
| 2014/0055493 A1* | 2/2014 | Cohen | A63F 13/323 345/633 |
| 2014/0067483 A1 | 3/2014 | Jeong et al. | |
| 2016/0109954 A1* | 4/2016 | Harris | G06F 3/011 345/156 |
| 2016/0162172 A1* | 6/2016 | Rathod | G06F 3/0481 715/747 |
| 2016/0202969 A1* | 7/2016 | Nachtigal | G06F 8/71 717/121 |
| 2017/0031676 A1 | 2/2017 | Cecchetti et al. | |
| 2017/0109667 A1 | 4/2017 | Marcu et al. | |
| 2017/0109676 A1 | 4/2017 | Marcu et al. | |
| 2017/0214701 A1 | 7/2017 | Hasan | |
| 2017/0221032 A1 | 8/2017 | Mazed | |
| 2017/0286133 A1 | 10/2017 | Rambhia et al. | |
| 2017/0353508 A1 | 12/2017 | Yoakum | |
| 2018/0129648 A1 | 5/2018 | Chakravarthy et al. | |

OTHER PUBLICATIONS

International Search Report and Written Opinion dated May 6, 2019, for corresponding International Application No. PCT/IB2019/050033, consisting of 13-pages.

International Search Report, dated Jan. 24, 2020, for corresponding PCT Application No. PCT/IB2019/059680, International Filing Date Nov. 12, 2019, consisting of 3 pages.

Written Opinion of the International Searching Authority, dated Jan. 24, 2020, for corresponding PCT Application No. PCT/IB2019/059680, International Filing Date Nov. 12, 2019, consisting of 6 pages.

* cited by examiner

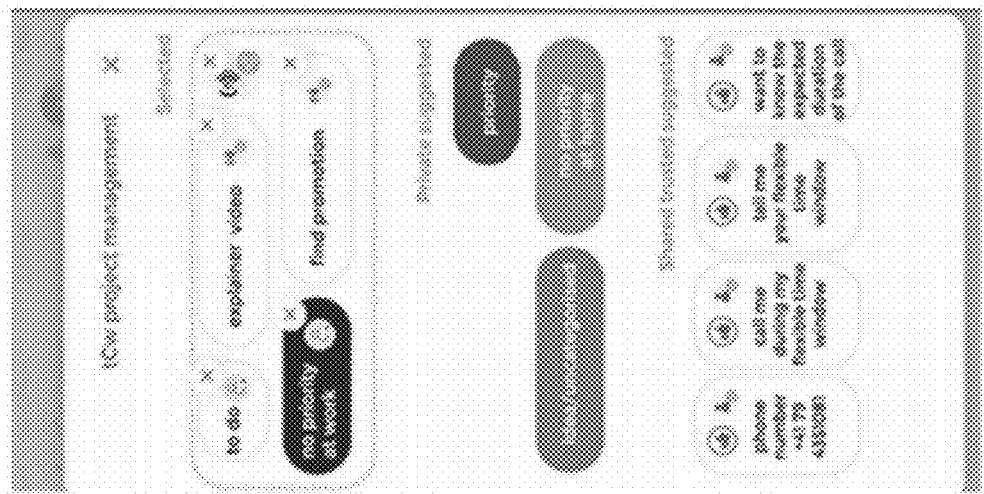
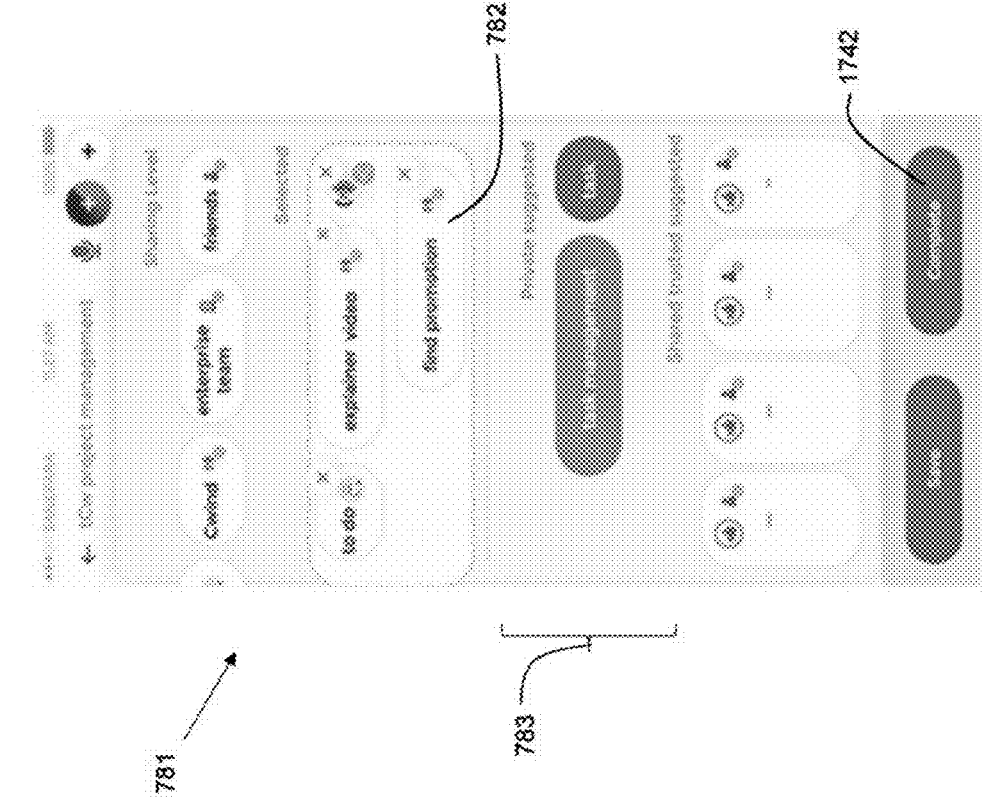
FIG. 10L
FIG. 10M

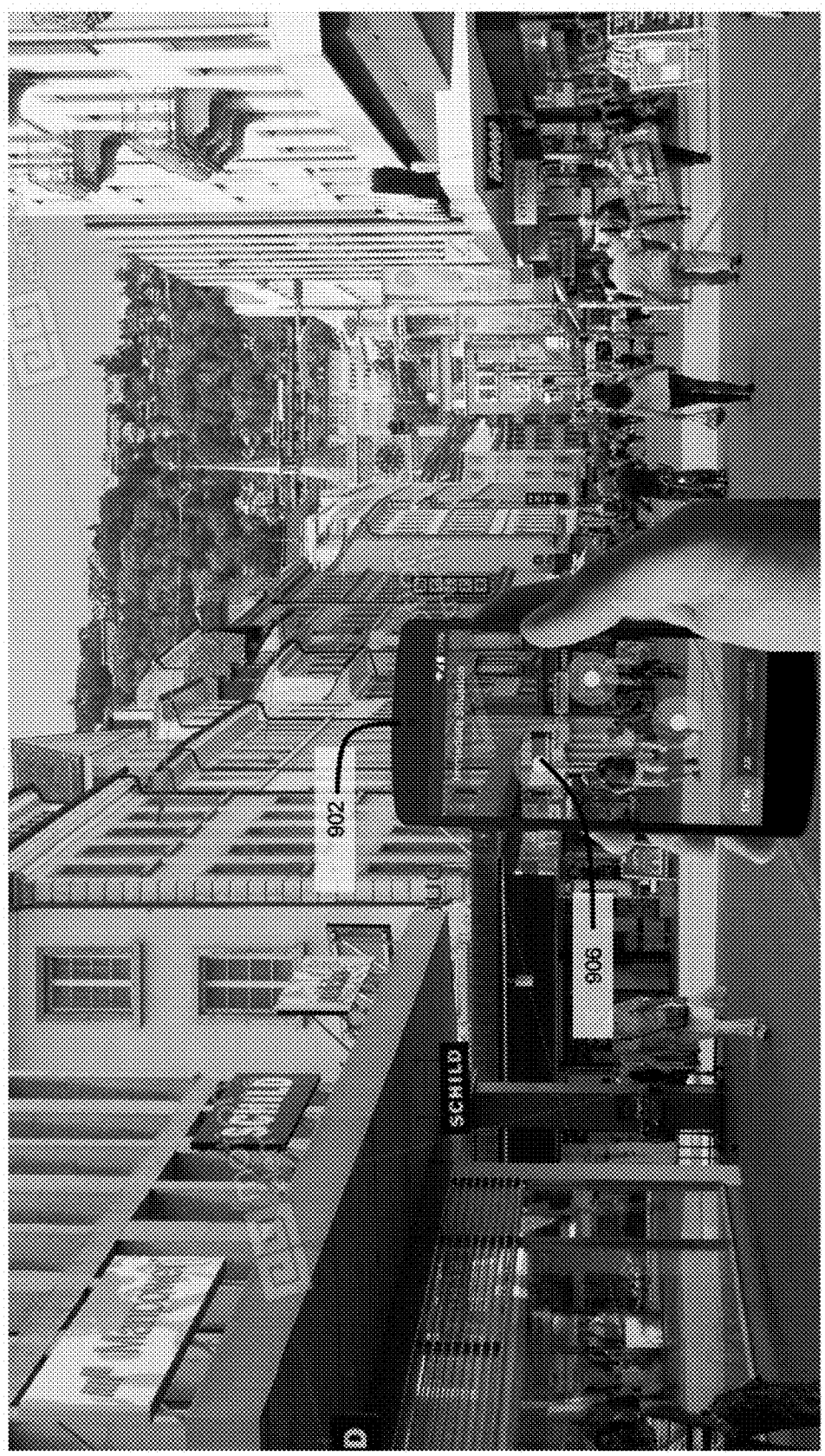

ly available at a particular location, e.g., "Joe" is online — they can start a conversation. Also, they can use the "Find Nearby People" feature to find other business people nearby — they can start a conversation.

SYSTEM AND METHOD FOR PROVIDING INTELLIGENT OPERANT OPERATING INTERFACE AND INTELLIGENT PERSONAL ASSISTANT AS A SERVICE ON A CRYPTO SECURE SOCIAL MEDIA AND CROSS BRIDGE SERVICE WITH CONTINUOUS PROSUMER VALIDATION BASED ON I-OPERANT+198 TAGS, I-BUBBLE+198 TAGS, DEMOJIS+198 AND DEMOTICONS+198

CLAIM OF PRIORITY

This application is a United States non-provisional patent application and claims priority to U.S. patent application Ser. No. 15/859,919, filed Jan. 2, 2018, herein incorporated by reference in its entirety.

FIELD OF THE EMBODIMENTS

The present embodiments relate generally to social media and service systems.

BACKGROUND

With the advent of smartphones, watches, and mobile wearable devices with smart projections, as well as improvements in battery, memory, and transaction velocity technology, people are increasingly using mobile devices and/or computers as part of their daily lives. Today, nearly everybody uses mobile devices, computers, papers and personal interaction at work and at home, and sometimes at the same time. Applications are based on developer defined menus without any possibilities for user, or quick service provider, adoption. This can cause a cognitive overload resulting from over-channeling and over-processing, resulting in misinformation and incorrect decisions. It is therefore desirable to have improvements in social media and service collaboration.

Examples of related art are described below:

U.S. Patent Publication No. 2004/0049345 generally describes a system architecture, and method for creating, storing, managing, accessing, communicating and displaying command, control and management information, to include text documents, tables, static map data and geographically reference dynamic data for the management of incidents or events by distributed, ad-hoc groups are described herein. The static map data may include, for example, cartographic data in digital format such as terrain data or street data. The dynamic data may include text, documents, tables, icons, and other symbology that graphically represent current status information (e.g., the current location of an incident, a resource, or the status of a facility). The system includes one or more client subsystems running purpose-built and/or conventional software applications that communicate with a server subsystem and can independently request, receive, store, and subsequently display the static map data and/or the dynamic data in document, tabular or graphical form. The display might include representing the dynamic data in graphical form either separately as tables and reports, or as an overlay on the static map data.

U.S. Patent Publication No. 2014/0067483 generally describes a system and method in which, when an apparatus for constructing a radar chart receives evaluation scores and weighted values of a plurality of evaluation items from a user, the apparatus divides a single circle into sectors corresponding to the amount of the evaluation items on the basis of the weighted values of the respective evaluation items, marks evaluation scores of the respective evaluation items on the radiuses of the sectors corresponding to the respective evaluation items, and connects spots in which the evaluation scores are marked, to construct a radar chart, and calculates achievement of the radar chart.

U.S. Patent Publication No. 2017/0031676 generally describes blockchain distribution of computer data. Computer data can comprise computer code, a computer code segment, a computer command, or a block of computer data, which can be employed by a device to patch software, change a device state, or synchronize data between devices. Blockchain distribution can provide benefits in a heterogeneous device environment, facilitate ad hoc device synchronization, and embody a distributed patch and communications network. Devices can receive a blockchain block from another device and, in some embodiments, enable other devices to access the block from the device. In some embodiments, devices can discard irrelevant blocks, however, an entire blockchain can be reconstructed where partial blockchain can be received from more than one device. Additionally, checkpoint blocks can enable devices to navigate the blockchain efficiently by skipping over known irrelevant blocks.

U.S. Patent Publication No. 2017/0109667 generally describes systems, methods, and computer programs that may be utilized to identify a sequence corresponding to an execution of a Business Processes (BP) using an automaton. In one embodiment, a monitoring agent generates a stream of steps that were performed during interactions with an instance of a software system belonging to a certain organization, and a simulation module simulates a running of an automaton on an input comprissequencesequencessubsequenceof steps that corresponds to a nonconsecutive execution of the BP, and the simulation module generates an indication indicative of a detection of an execution of the BP.

U.S. Patent Publication No. 2017/0109676 generally describes systems, methods, and computer programs for generating candisequencessequencessequencessequenceso executions of a Business Process (BP).

U.S. Patent Publication No. 2017/0221032 generally describes systems and methods for synthesizing a social network, electronic commerce (including performance based advertisement and electronic payment), a mobile internet device and a machine learning algorithm(s), utilizing a classical computer or a quantum computer enhanced machine learning algorithm(s), utilizing a quantum computer. The synthesized social commerce further dynamically integrates stored information, real time information and real time information/data/image(s) from an object/array of objects (Internet of Things (IoT)). The machine learning algorithm(s), utilizing a classical computer can include a software agent, a fuzzy logic algorithm, a predictive algorithm, an intelligence rendering algorithm and a self-learning (including relearning) algorithm.

None of the art described above addresses all of the issues that the present invention does

SUMMARY OF THE EMBODIMENTS

According to an aspect of the present invention, a computer-implemented method for providing an intelligent personal assistant is provided. The method includes opening a digital application on an electronic device, connecting one or more third party applications with the digital application, determining one or more tasks to be performed using the one or more third party applications, creating one or more operants/bubbles, wherein each operant/bubble corresponds to at least one of the one or more tasks, selecting one or more operants/bubbles using the graphical user interface, and running the selected one or more operants/bubbles, using the graphical user interface, enabling control of the one or more third party applications using the digital application.

It is an object of the present invention to provide the method, wherein the method further includes registering with the digital application.

It is an object of the present invention to provide the method, wherein the user can register, profile and get trusted with the digital application as: a public user; a professional user; a service provider; a company; or an institution.

It is an object of the present invention to provide the method, wherein creating the one or more operants/bubbles further includes submitting the one or more operants/bubbles for approval.

It is an object of the present invention to provide the method, wherein the method further includes, after submitting the one or more operants/bubbles for approval, adopting or rejecting the one or more operants/bubbles submitted for approval.

It is an object of the present invention to provide the method, wherein the method further includes communicating with one or more secondary users within, or outside of, given trusting levels or authorities using the digital application.

It is an object of the present invention to provide the method, wherein the method further includes collaborating, using the digital application, on one or more projects with the one or more secondary users within, or outside of, given trusting levels or authorities.

It is an object of the present invention to provide the method, wherein the method further includes requesting one or more goods or services using the digital application on its best situational channel.

It is an object of the present invention to provide the method, wherein the method further includes purchasing at least one of the one or more goods or services using the digital application on its best situational channel.

It is an object of the present invention to provide the method, wherein the method further includes releasing the one or more operants/bubbles for public use.

According to another aspect of the present invention, a computer-implemented system for providing an intelligent personal assistant is provided. The system includes a first electronic device, including a memory, a processor, and a graphical user interface or smart projection, wherein the first electronic device is configured to enable a user to open a digital application, wherein the digital application is run using the processor, connect one or more third party applications with the digital application, determine one or more tasks to be performed using the one or more third party applications, create, using the graphical user interface, one or more operants/bubbles, wherein each operant/bubble corresponds to at least one of the one or more tasks in a specific sequence, select one or more operants/bubbles using the graphical user interface, and run the selected one or more operants/bubbles, using the graphical user interface, enabling control of the one or more third party applications using the digital application on its best situational channel.

It is an object of the present invention to provide the system, wherein the first electronic device is further configured to enable the user to register with the digital application, using the graphical user interface.

It is an object of the present invention to provide the system, wherein the user can register, profile, and get trusted with the digital application as: a public user; a professional user; a service provider; a company; or an institution.

It is an object of the present invention to provide the system, wherein creating the one or more operants/bubbles further includes submitting the one or more operants/bubbles for approval.

It is an object of the present invention to provide the system, wherein the system further includes a second electronic device configured to enable a second user to, after submitting the one or more operants/bubbles for approval, adopt or reject the one or more operants/bubbles submitted for approval.

It is an object of the present invention to provide the system, wherein the system further includes one or more second electronic devices, wherein the digital application enables the user and one or more second users to communicate via the first electronic device and the one or more second electronic devices on its best situational channel.

It is an object of the present invention to provide the system, wherein the first electronic device and the one or more second electronic devices are configured to enable the user and the one or more second users to collaborate, using the digital application, on one or more projects.

It is an object of the present invention to provide the system, wherein the first electronic device is further configured to enable the user to request one or more goods or services using the digital application.

It is an object of the present invention to provide the system, wherein the first electronic device is further configured to enable the user to purchase at least one of the one or more goods or services using the digital application.

It is an object of the present invention to provide the system, wherein the first electronic device is selected from the group consisting of: a watch; smart phone; a desktop computer; a laptop computer; a tablet computer and/or any other suitable wearable electronic device.

BRIEF DESCRIPTION OF THE DRAWINGS

FIG. 10C-10O shows examples of D-emojis/D-emoticons based on low level and high level operant/bubble tag(s), operant/bubble tag sequence(s)/chain(s), integrating operant/bubble tag circle(s) and Semi-Essential and Essential operant/bubble types (fix sequence of operants/bubbles; essential as they are approved by the corresponding trusting level or authority).

FIG. 12A-12C show another mixed reality user experience in accordance with embodiments of the present invention.

Figure 1:
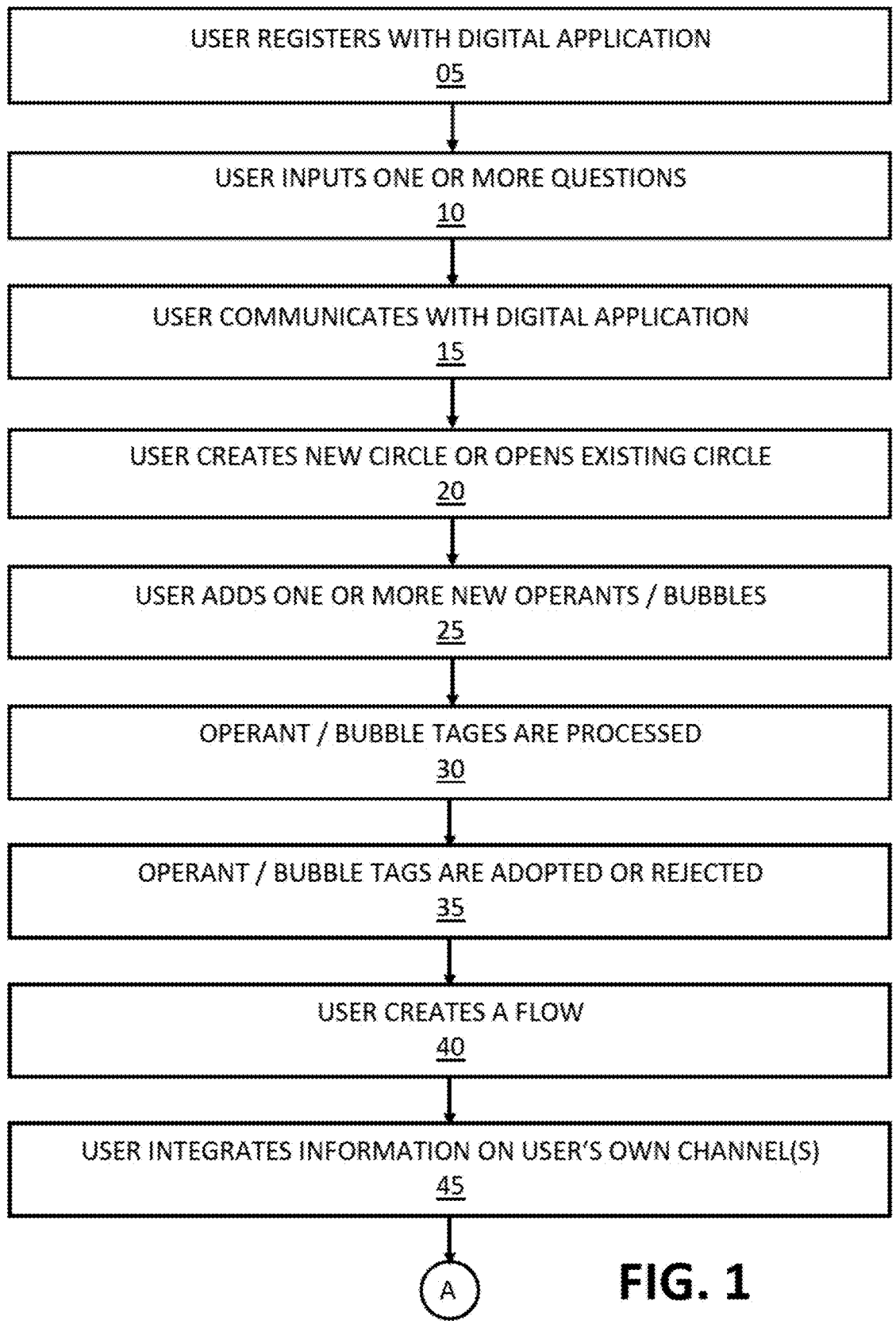
FIG. 1-2 is a flowchart of a method for providing an Intelligent Personal Assistant as a Service (iPaaS) in accordance with embodiments of the present invention.

The structure, operation, and advantages of disclosed embodiments will become further apparent upon consideration of the following description taken in conjunction with the accompanying figures (FIGS.). The figures are intended to be illustrative, not limiting. Certain elements in some of the figures may be omitted, or illustrated not-to-scale, for illustrative clarity.

DETAILED DESCRIPTION

Disclosed embodiments provide a prosumer crypto social media and cross-bridge service collaboration platform in a secure and trusted network based on crypto technology (such as theCwind service chains/hashgraph chain/blockchain), which helps to manage activities and information workflow, and improves multiparty collaboration and (trusted) multichanneling between amateurs, intelligences, knowledge workers and service providers and their specific sharing of information. Disclosed embodiments further serve as a community connector with social, peer to peer and knowledge networks built on crypto technologies that facilitates the trusted exchange of goods and services between suppliers and end users. Disclosed embodiments enable improved in context management of notes, searches, contacts, responsibilities, information and file sharing, two-/multi-sided confirmed appointments, two-/multi-sided bookings/sales/data requests, events, postings, status tracking, procedures, invoicing/payments, advertise, ratings, two-/multi-sided decision making, support, negotiations, trusted voting, trusted signing, engaging, hiring and other transactional exchanges. This allows creation of a unique and superior information channel with excellence in customer service and serviceability.

According to an embodiment, the present invention provides for systems and methods for providing an Intelligent Personal Assistant as a Service (iPaaS) into the market. There are personal assistants that presently exist in the market, such as Google Assistant, Siri, Cortana and Amazon Echo, but these personal assistants fail to provide the services and sophisticated networking abilities as those of the present invention. According to an embodiment, the iPaaS interacts across digital platforms and makes decisions for the user, enabling the user to take advantage of the latest crypto technology.

According to an embodiment, the iPaaS allows users to connect to and use cloud-based productivity applications over the Internet. These cloud-based productivity applications may include, e.g., e-mail, calendaring, office tools, scheduling, e-commerce, task management, and/or any other relevant cloud-based productivity applications. According to an embodiment, all of the cloud-based productivity applications are interconnected with each other on the same platform.

According to an embodiment, the iPaaS is an Intelligent Personal Assistant, which is defined as a personal assistant that incorporates one or more complex systems with multiple Artificial Intelligence (AI) systems built in. The complexity of such a platform usually comes on the system side and AI side. On the system side, the question is how to combine individual components into an ecosystem with easy scalability and maximum flexibility? Such a platform needs to be able to dynamically scale service instances up and down based on the current load. On the AI side, the question is how does the accuracy of each individual component affect end-to-end accuracy which decide, and how to choose each AI component so that the end-to-end accuracy is maximized. The present iPaaS system answers these questions and, thus, is an improvement upon the existing technologies. According to an embodiment, the iPaaS invention includes a personal assistant powered by AI and crypto technology that will improve the daily digital and real life of the user.

According to an embodiment, iPaaS provides a complete software solution that can be accessed from a cloud service provider. According to an embodiment, one or more third party applications are accessed via a digital application incorporated in the iPaaS personal assistant. According to an embodiment, the digital application is accessed using an electronic device. The electronic device may be a watch, smart phone, a tablet computer, a laptop computer, a desktop computer, and/or any other suitable wearable electronic device. According to an embodiment, the iPaaS personal assistant is granted access to the one or more third party applications prior to use by the user through the digital application.

AI is changing how people interact with technology. Many people have become familiar with touching and talking to their smartphones, watches, and/or projections of their wearable device(s). Future relationships between human and machines has become more decorated, smooth, and more personalized than ever. AI systems are beginning to learn how to adapt to personal characteristics and purposes. The present invention takes advantage of these aspects of AI and allows users to import information into intelligent operants intelligent bubbles, integrate by swiping operants/bubbles, operationalize and automate (by integrating features into operants/bubbles) their activity or work steps in hashgraph safe and trusted networks. According to an embodiment, the platform of the present invention enables users to cut and paste operants/bubbles or circles into or from social media channels, collaboration channels, e-commerce channels, and supply chain service channels as well.

According to an embodiment, using the digital application and the electronic device, the user accesses the one or more third party application over the Internet, usually with a web browser or even with a mobile wearable device. By enabling the user to access all of the third party applications using the iPaaS personal assistant, all of the underlying infrastructure, middleware, application software, and application data are all decentralized, saving the user time, which in turn can also save the user battery life on the electronic device the user is using, further improving upon the existing technologies. According to an embodiment, the iPaaS personal assistant manages the hardware and software, and with the appropriate service agreements, ensures the availability and the security of the one or more third party applications and the user's data as well. Furthermore, the present invention captures the power of the Internet and fellows the prosumer approach, based on operants/bubbles and prosumer adoptable menus (including operant/bubble standard and non-standard appearances), to accomplish improvements in the user's daily digital life and real life.

A prosumer is, by definition, a person who consumes and produces media. The term "prosumer" is derived from the word "prosumption", a dot-com era business term meaning "production by consumers". These terms were coined by American futurist Alvin Toffler, and were widely used by many technology writers of the time. Today it generally refers to a person using commons-based peer production.

According to an embodiment, the basic elements of the iPaaS platform are the intelligent operants/bubbles, intelligent tags, intelligent sequences/chains, and circles. According to an embodiment, intelligent operants/intelligent bubbles are defined as standardized information carriers. These intelligent operants/intelligent bubbles may be adopted or collected as follows:

Conditioned operants/bubbles and connected operants/bubbles:

Sequences/chains (flow) are the basic elements of the conditioned operants/bubbles and connected operants/bubbles. When needed, these sequences/chains can encompass a user-defined high-level operant/bubble. Operants/bubbles in a sequence/chain (herein referred to an "operant/bubble sequence/chain") are the user steps that are taken and protocoled, automatically recorded, adopted, and highly secured. According to an embodiment, theCwind can protocol these steps when users are buying/selling, taking notes, approving etc.

Operants/bubbles and high level operants/high level bubbles are text and/or structured forms.

Semi-Essential and Essential operant/bubble types. Essential is herein defined as strictly theCwind approved, and semi-essential is herein defined as partially theCwind approved: e.g., a function or feature appears when the user needs it. Semi-Essential and Essential operant/bubble types are accessible via ∞ or specific link from and to any social media platform ( ∞ i(ntelligent)-activity-operanttag, ∞ i(ntelligent)-activity-bubbletag). e.g. ∞ share ∞ offer ∞ sell ∞ buy ∞ rent ∞ make-a-gift ∞ book ∞ pay ∞ sign-in ∞ disconnect ∞ sign-digitally ∞ login ∞ sign-in-with-e-ID ∞ sign-up-via-professional-email ∞ hire ∞ connect ∞ sign-in-with-social-login ∞ sign-with-e-ID ∞ swipe-out-of-sequence ∞ fire swipe-into-sequence ∞ define-focus-of-circle ∞ change-hiring ∞ swipe-into-circle ∞ swipe-out-of-circle ∞ define-high-level-operant ∞ create-sub-timeframe ∞ delegate ∞ create-sub-process ∞ create-sub-locationframe ∞ define-sharing-level ∞ evaluate ∞ give-pros ∞ give-cons ∞ push-acceptance ∞ pull-obligation-only ∞ select-channel ∞ create-sub-event ∞ profile-for-service ∞ select-best-channel-for-situation ∞ import ∞ push-or-pull ∞ ping-me-on ∞ service-feed ∞ work-feed ∞ accept-alignment ∞ rate ∞ accept-shared-decision ∞ accept-informed-consent ∞ down-voting ∞ social-feed ∞ open-new-decision-cascade ∞ open-new-service-cascade ∞ stop-tracking ∞ post ∞ place-offer-only ∞ place&order&pay ∞ send-trusted-registered ∞ dislike ∞ detect ∞ accept-trusted-3-party ∞ accept-3-party-status ∞ refuse-3-party-status ∞ approve ∞ setup-situation ∞ setup-sub-situation ∞ view-trusted-register ∞ disapprove ∞ like ∞ meet-virtually-only ∞ instantly-virtually-only ∞ setup-fix-timeframe ∞ negotiate ∞ setup-flexible-time-frame ∞ meet-physical-at-service-provider ∞ prescribe ∞ audit ∞ locally-virtually-assisted ∞ buy-locally ∞ deliver-by-priority-mail ∞ distrust ∞ lead ∞ deliver-by-non-priority-mail ∞ transfer-information-to-action-bubble ∞ command ∞ select-operant-appearance ∞ transfer-information-to-action-operant ∞ up-voting ∞ interfere ∞ compare ∞ adopt ∞ neutralize ∞ search ∞ note ∞ follow ∞ block ∞ certify ∞ make-uncertified ∞ delete-post ∞ automate ∞ send ∞ schedule ∞ confirm ∞ request ∞ unfollow ∞ organize ∞ publish ∞ simulate ∞ copy ∞ identify ∞ consult ∞ support ∞ get-aligned ∞ include ∞ cancel ∞ accept ∞ refuse ∞ capture ∞ track ∞ measure ∞ socialize ∞ exclude ∞ export ∞ record ∞ insert ∞ deposit ∞ deliver ∞ pick-up ∞ apply ∞ monitor ∞ define-activity-cycle ∞ define-match-action ∞ match ∞ vote Trusting level or authority specific operant/bubble types (fix sequence of operants/bubbles; approved by the corresponding trusting, level or authority). Operant/bubble types accessible via ∞ or specific link from and to any social media platform (∞ i(ntelligent)-activity-operanttag, ∞ i(ntelligent)-activity-bubble-tag). e.g. ∞ share ∞ offer ∞ sell ∞ buy ∞ rent ∞ make-a-gift ∞ book ∞ pay ∞ sign-in ∞ disconnect ∞ sign-digitally ∞ login ∞ sign-in-with-e-ID ∞ sign-up-via-professional-email ∞ hire ∞ connect ∞ sign-in-with-social-login ∞ sign-in-with-e-ID ∞ swipe-out-of-sequence ∞ fire swipe-into-sequence ∞ define-focus-of-circle ∞ change-hiring ∞ swipe-into-circle ∞ swipe-out-of-circle ∞ define-high-level-operant ∞ create-sub-timeframe ∞ delegate ∞ create-sub-process ∞ create-sub-locationframe ∞ define-sharing-level ∞ evaluate ∞ give-pros ∞ give-cons ∞ push-acceptance ∞ pull-obligation-only ∞ select-channel ∞ create-sub-event ∞ profile-for-service ∞ select-best-channel-for-situation ∞ import ∞ push-or-pull ∞ ping-me-on ∞ service-feed ∞ work-feed ∞ accept-alignment ∞ rate ∞ accept-shared-decision ∞ accept-informed-consent ∞ down-voting ∞ social-feed ∞ open-new-decision-cascade ∞ open-new-service-cascade ∞ stop-tracking ∞ post ∞ place-offer-only ∞ place&order&pay ∞ send-trusted-registered ∞ dislike ∞ detect ∞ accept-trusted-3-party ∞ accept-3-party-status ∞ refuse-3-party-status ∞ approve ∞ setup-situation ∞ setup-sub-situation ∞ view-trusted-register ∞ disapprove ∞ like ∞ meet-virtually-only ∞ instantly-virtually-only ∞ setup-fix-timeframe ∞ negotiate ∞ setup-flexible-time-frame ∞ meet-physical-at-service-provider ∞ prescribe ∞ audit ∞ locally-virtually-assisted ∞ buy-locally ∞ deliver-by-priority-mail ∞ distrust ∞ lead ∞ deliver-by-non-priority-mail ∞ transfer-information-to-action-bubble ∞ command ∞ select-operant-appearance ∞ transfer-information-to-action-operant ∞ up-voting ∞ interfere ∞ compare ∞ adopt ∞ neutralize ∞ search ∞ note ∞ follow ∞ block ∞ certify ∞ make-uncertified ∞ delete-post ∞ automate ∞ send ∞ schedule ∞ confirm ∞ request ∞ unfollow ∞ organize ∞ publish ∞ simulate ∞ copy  ∞ identify  ∞ consult  ∞ support  ∞ get-aligned  ∞ include  ∞ cancel  ∞ accept  ∞ refuse  ∞ capture  ∞ track  ∞ measure  ∞ socialize  ∞ exclude  ∞ export  ∞ record  ∞ insert  ∞ deposit  ∞ deliver  ∞ pick-up  ∞ apply  ∞ monitor  ∞ define-activity-cycle  ∞ define-match-action  ∞ match  ∞ vote.

Circles (same level information with focus on an issue) are the basic elements. According to an embodiment, non-essential circles (each operant/bubble of this circle represents an option) can be used on the popup menu to define a specific type of operant/bubble.

Semi-Essential and Essential circles (essential as they are essential options of any type of operant/bubble) e.g. sharing levels, screen appearance (operant/bubble sequence/chain appearances) could be in two styles. The first style is the Vertical operant/bubble sequence/chain (bottom up) "feed" and the Vertical operant/bubble sequence/chain (top down) "feed". The second style is the Horizontal operant/bubble sequence/chain "feed", interference screen. Operant/bubble integration appearances: Focused circle with unique tags and relative order) etc. on combined menus. Essential circles are essential part of any operant/bubble. The operants/bubbles on this circle represent the options on a popup menu. (∞ i(ntelligent)-integration-operanttag; ∞ i(ntelligent)-integration-bubbletag; ∞ i(ntegration)-circletag).

Figure 3:
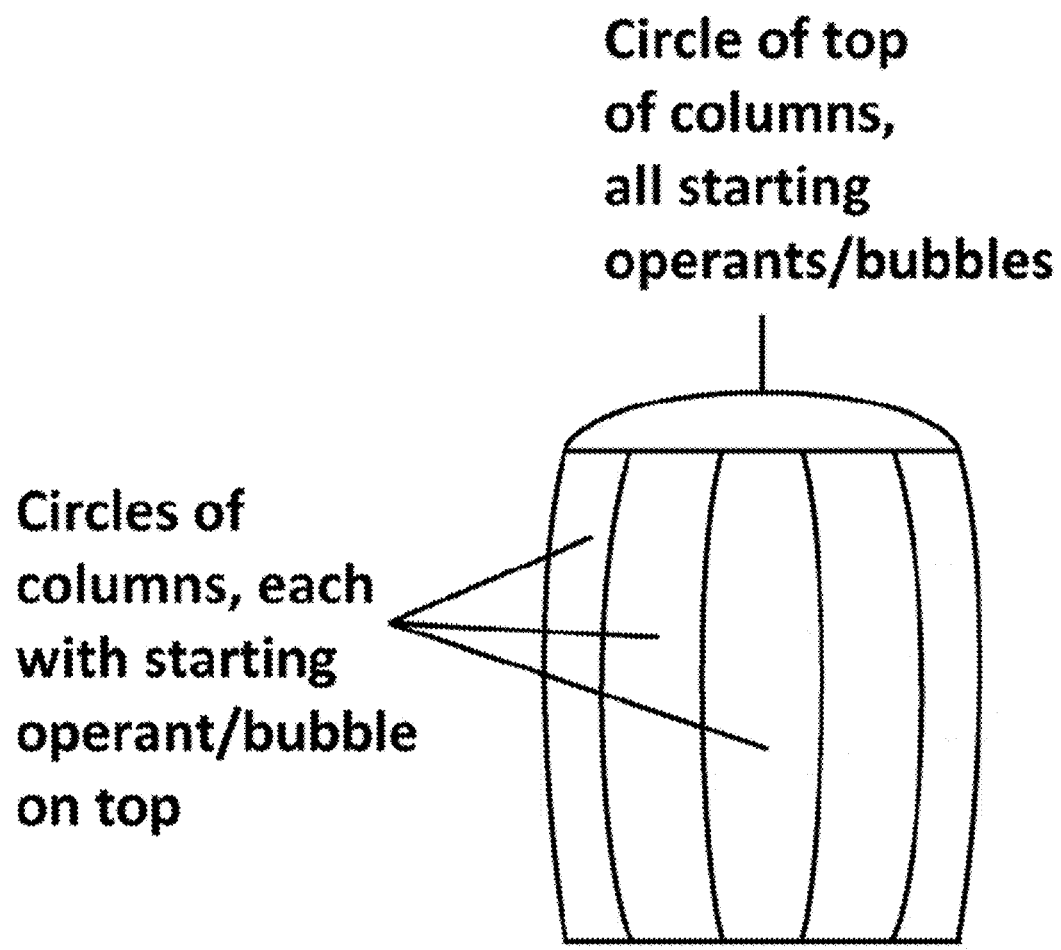
FIG. 3 is a diagram of a vertical operant/bubble sequence/chain (bottom up) "feed" for accessing and providing a decision matrix in accordance with embodiments of the present invention.
Figure 17:
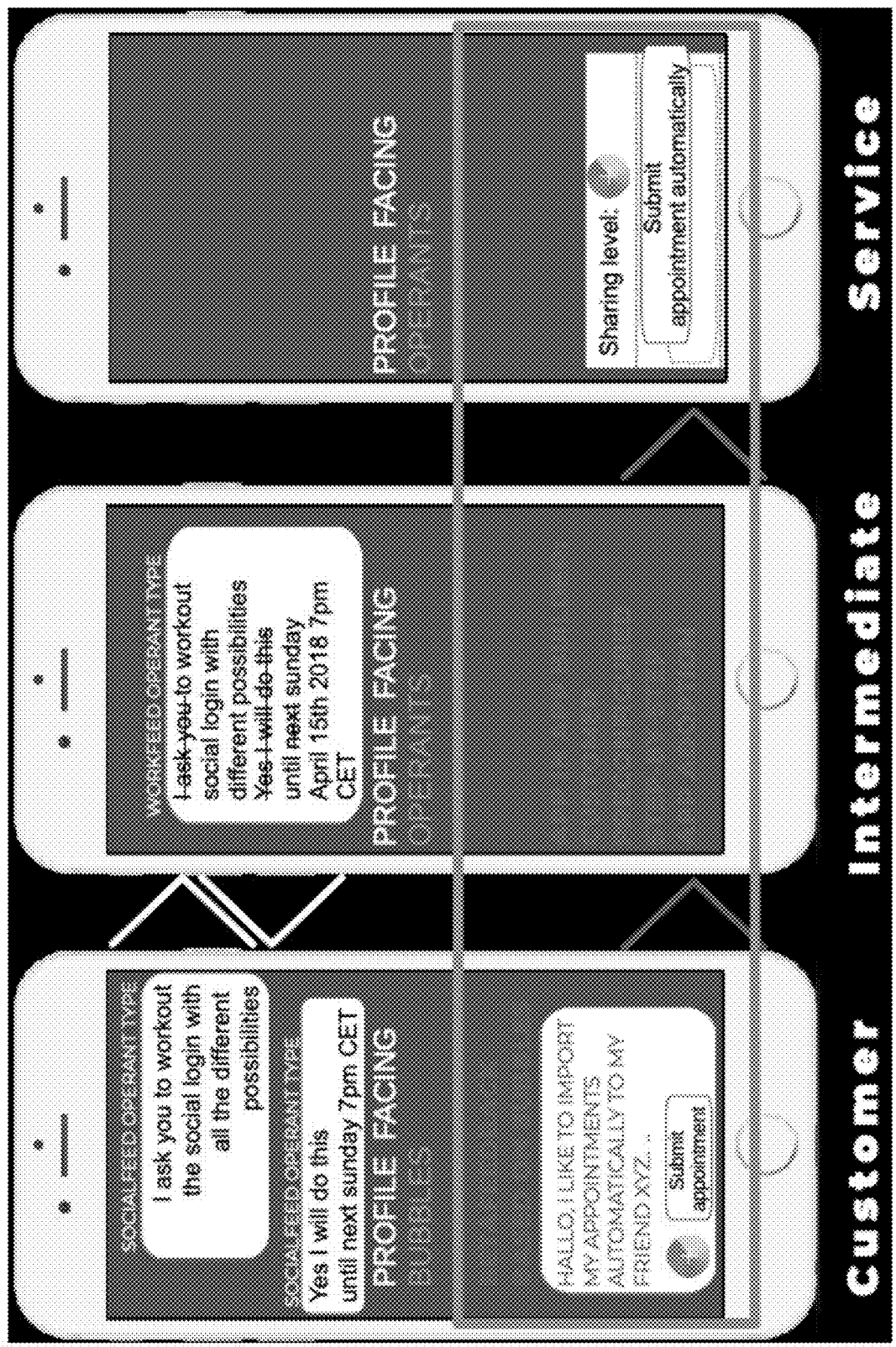
FIG. 17 is multiple screenshots of the present application translating from one operant/bubble type to another operant/bubble type.

According to an embodiment, each type of operant/bubble can be showed in a different style menu configuration (appearances) e.g. Vertical operant/bubble sequence/chain (bottom up) "feed", Vertical operant/bubble sequence/chain (top down) "feed", Horizontal operant/bubble sequence/chain "feed", focused circle with "active borders" to connect or integrated any operant/bubble or high level operants/bubbles to a circle, Vertical operant/bubble sequence/chain (bottom up) "feed" by columns circle and by the operants/bubbles of the circles for providing an accessible decision matrix with starting operant/bubble on top (as shown in FIG. 3). According to an embodiment, on an intermediate screen, an information translation of one operant/bubble type into another operant/bubble type takes place (as shown in the App in App Builder of FIG. 17, showing a customer screen, an intermediate screen, and a service screen). According to an embodiment, combined screens may be used, with operants/bubbles and standard menus with essential and non-essential circles (non-essential meaning exchangeable by the user settings), with operants/bubbles, with high level operants/bubbles, and with menu structure. According to an embodiment, prosumer menus may also be incorporated that can be adopted by daily regular users or service providers. According to an embodiment, the present invention may further capture information, incorporate information integration features, and/or provide marketing and/or advertising campaigns for companies.

The digital application described according to the present invention is the first community connector of social, peer-to-peer, and knowledge networks built on sustainable hashgraph and blockchain with capabilities that facilitates information integration, activity flow, improves interaction and collaboration between all actors and facilitates the trusted exchange of goods and services between suppliers and end users like amateurs or any intelligence.

The present invention connects the dots for premium services in the worldwide mobile telecommunication, software, and e-service market. It identifies and provides trust for user profiles and matches the last steps taken by the client with service touch points of service providers in an open, but trusted, crypto secured, non-traceable, and aligned network. The present invention replaces the "ok" and "cancel" or informed consent of static mobile applications by intelligent sequences of addressable service actions on a dynamic application, where service providers pay per click of used service bubbles or operants "∞". This enables the application of the present invention to earn trusting fees, commissions fees, and/or consulting fees for specialized services.

For amateur users, the present invention offers a unified set of functions (so called "cross services"). According to an embodiment, it includes a public decision engine for relevant support and timely decisions, an agenda, a situational or work recognition board, and/or a just-in-time management, e.g., the present application enables trusted selfie of the user's real & digital life and makes values visible and personally addressable for shared and better decisions by using predefined and trusted information structures of trusted authorities, called intelligent bubbles or operants.

The present invention offers a communication platform, e.g. a client may ask his/her lawyer for assistance in order to write an opposition letter, to sign, and to send a registered document with a registered message to the opposite party and giving access to third parties of the involved lawyers.

According to an embodiment, the present invention also provides a social and collaboration networking with an intelligent personal assistant and relation manager that respects selected privacy and tracks information distribution to selected sharing levels.

According to an embodiment, the present invention is configured to aid users in finding and hiring the right people for jobs and acquiring the right trade products and/or services on a market with logic decision support.

According to an embodiment, the present invention supports service providers, intelligences, and front line users with an intelligent Personal Assistant as a Service (the so-called iPaaS), with an integrated, crypto secure process and client relation manager to help users run their business (es). According to an embodiment, the present invention focuses on highly resource consuming service segments, e.g., in Healthcare for personal records, i-studies in clinical trial units, patient relation manager, e.g. a banking segment for a client relation manager, consulting, etc.

According to an embodiment, the present invention provides internal support for sensitive information with automatic mapping, structuring, and supply chain analysis of complex service environments.

As some web applications may enable users to easily create webpages, e.g., an online store, personal webpage, etc., the present invention enables users to easily create application, working as a sort of app-in-app builder or service manager (as shown in FIG. 17) that can be adopted according to user feedback without the need for IT services. According to an embodiment, the present invention enables internal procedures to become sharable to others, enables users to connect with trusted clients, and, protected procedures such as banking and legal procedures, enhances the secrecy of services by enabling cryptography and non-traceability. According to an embodiment, the present invention is also adoptable by supply chain manager.

According to an embodiment, the platform of the present invention includes four user categories and seven trust level categories. It is noted, however, that the platform may include any suitable number of categories and/or trust levels.

According to an embodiment, the first user category includes daily public users, the second user category includes professionals (e.g., lawyers, doctors etc.), the third user category includes service providers, and the fourth user category includes private companies and institutions.

According to an embodiment the seven trust level categories may include:

- Level 1—User-specific approved, no bio-identification, no crypto-technology,
- Level 2—Trusted user approved with bio-identification and completed trusting cascade (mind-map), crypto (block-chain, or hashgraph) protection.
- Level 3—Trusted Essential parts and theCwind admin panel approved. According to an embodiment, these are essential. According to an embodiment, this level further includes trusted semi-essential parts and trusted user approved.
- Level 4—Trusted and theCwind admin panel approved. These are essential.
- Level 5—Trusted and authority approved, icon visible, and verifiable for whole theCwind community.
- Level 6—Trusted and company/institute supervisor approved, icon visible, and verifiable for whole theCwind community.
- Level 7—Trusted and entity moderator approved, icon visible and verifiable for whole theCwind community.

According to an embodiment, the digital application of the present invention includes suites that include a menu, an operant/bubble, and specific menus (e.g., dynamic agenda, notifications, alerts, files, links, personal filters, etc.).

According to an embodiment, each operant/bubble has a sharing level that includes private, friends, groups, and company, institutions or other authorities with content protection. According to an embodiment, if, for example, a user wishes to share with a friend, there is a list of friends from which the user may choose.

According to an embodiment, there are different possibilities to show an operant/bubble and operant/bubble sequences/chains. According to an embodiment, one way is by menu. According to an embodiment, another way is by finding a match of one or more already selected operants/bubbles and offering a suggested operant/bubble.

Figure 2:
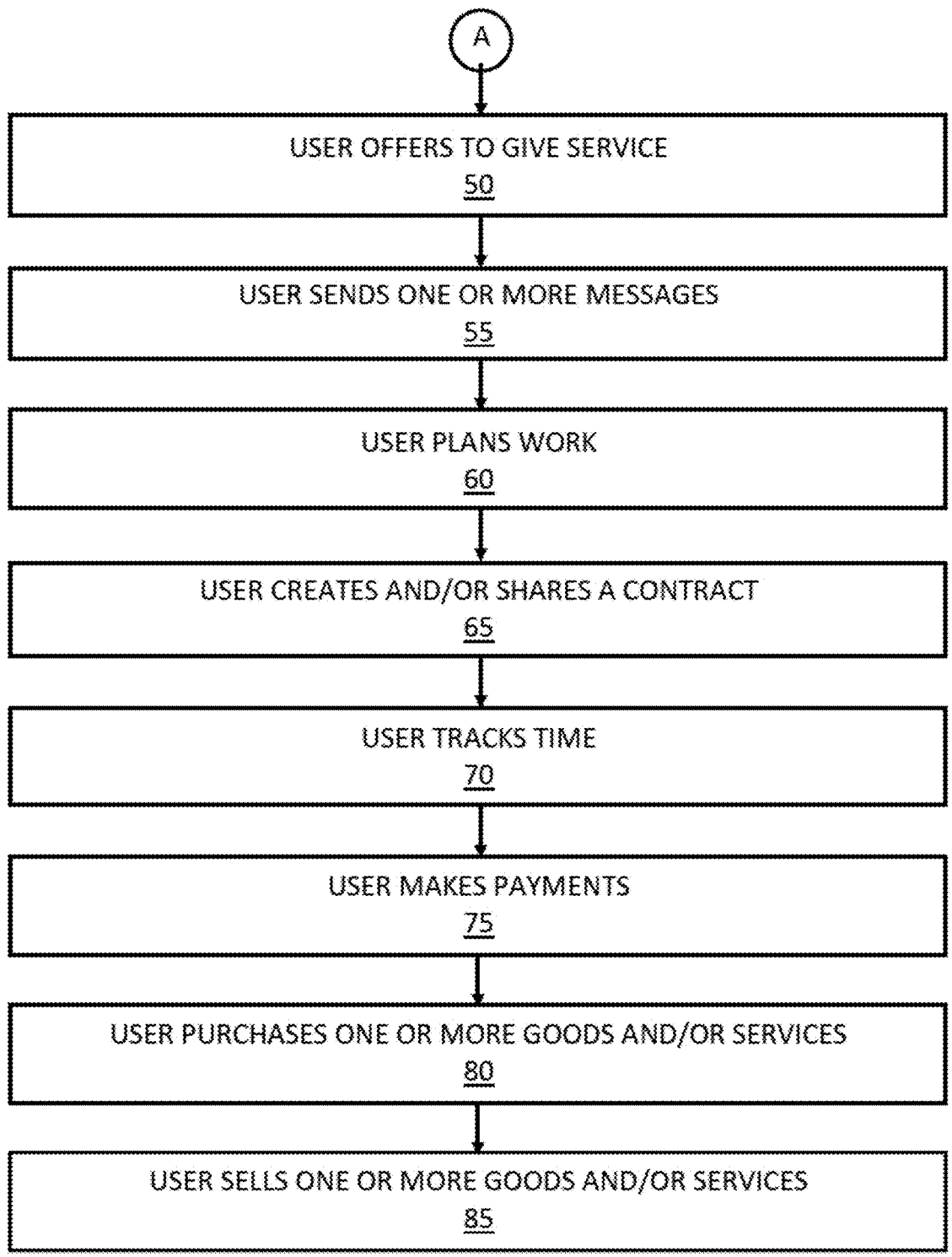

Referring now to FIG. 1-2, a method for providing an iPaaS personal assistant is illustratively depicted, in accordance with an embodiment of the present invention.

At step 05, a user registers with the digital application. According to an embodiment, the user has the option register as a public user, as a professional user, as a service provider, and/or as a company or an institution. After registration, at step 10, the digital application requests that the user input one or more questions. According to an embodiment, an empty screen appears on the display with an input box that says "Ask me anything!". At step 15, the user communicates with the digital application. According to an embodiment, the user communicates with the iPaaS platform by either typing in the search box or by talking. It is noted, however, that other forms of communication may also be implemented, in accordance with an embodiment of the present invention.

At step 20, using a graphical user interface or a smart projection on the electronic device, the user creates a new circle or opens an existing circle. At step 25, using the graphical user interface, the user adds one or more new operants/bubbles. According to an embodiment, all operants/bubbles and circles created by the user stay as private until approved by theCwind admins and released for public use. Operant/bubble tags are processed, at step 30, and adopted or rejected, at step 35.

According to an embodiment, the platform of the present invention enables the user to create a flow (steps/procedures defined by operant/bubble to operant/bubble connections, sequences/chains), at step 40, and integrate information on their own channels, at step 45. According to an embodiment, one or more users, at step 50, can offer or give any service.

According to an embodiment, the user can communicate with one or more other users. The user may send one or more messages (at step 55), plan work (at step 60), create and/or share a contract (at step 65), track time (at step 70), and make payments (at step 75). It is noted, however, that other suitable functions may also be available to the user, while maintaining the spirt of the present invention. These functions enable the platform of the present invention to create a communication and collaboration platform. This communication and collaboration platform may be a social feed based on social one or more feed-type operants/bubbles (similar to Whatsapp) and work feed-type operants/bubbles (similar to Google Live documents).

According to an embodiment, the user, at step 80, purchases one or more goods and/or services and/or, at step 85, sells one or more goods and/or services. According to an embodiment, the user performs these steps in conjunction with one or more marketplace-type operants/bubbles (e.g., buy-type operants/bubbles, sell-type operants/bubbles, etc.).

According to an embodiment, the platform of the present invention can further act as a service platform, incorporating aligned decision making-type operants/bubbles, and/or as a job platform, incorporating hiring-type operants/bubbles.

Figure 4:
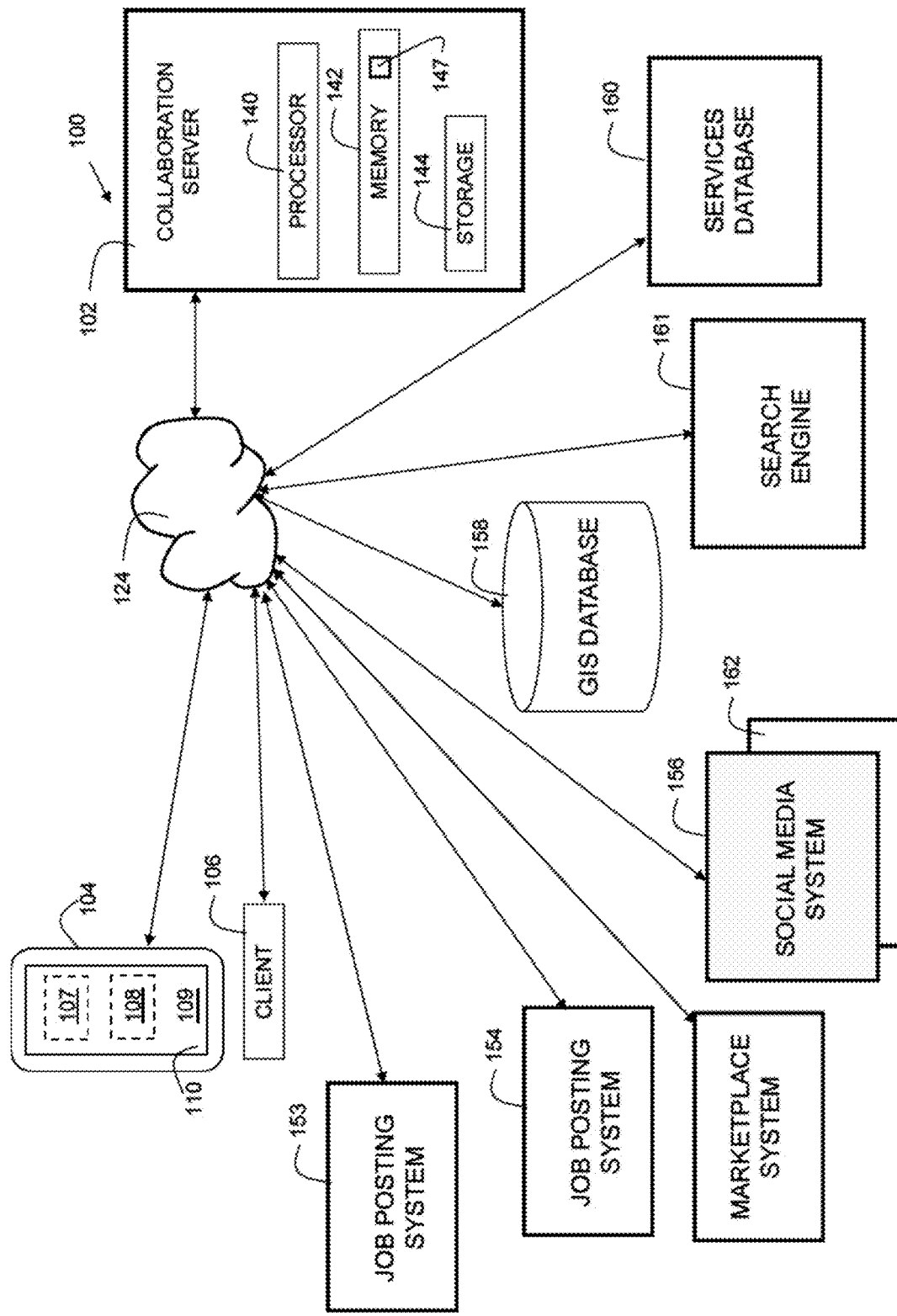
FIG. 4 is a diagram of a system in accordance with embodiments of the present invention.

FIG. 4 is a diagram of a system 100 in accordance with embodiments of the present invention. A collaboration server 102 can be implemented in an electronic computing device that includes a processor 140, a memory 142 coupled to the processor, and storage 144, also coupled to the processor. Memory 142 contains program instructions 147, that when executed by the processor 140, cause the collaboration server 102 to perform steps in accordance with embodiments of the present invention. Memory 142 may be a non-transitory computer readable medium. Memory 142 may include, but is not limited to, flash, read-only memory (ROM), static random-access memory (SRAM), magnetic storage, optical storage, or other suitable storage mechanism. Storage 144 may include one or more magnetic hard disk drives (HDD), solid state disk drives (SSD), optical storage devices, tape drives, and/or other suitable storage devices.

The processor 140 may include multiple cores. In embodiments, the collaboration server 102 may include multiple processors, where each processor includes multiple cores. Embodiments may schedule tasks and threads over multiple processors and/or cores to achieve a level of parallelism in execution of various tasks such as computations, searching, comparing, and/or rendering.

The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet can be provided by Internet service providers (ISP). Users on client systems, such as client devices 104 and 106 obtain access to the Internet through the Internet service providers. Access to the Internet allows users of the client computer systems to exchange information, receive and send e-mails, and view documents, such as documents which have been prepared in the HTML format. These documents are often provided by web servers which are considered to be "on" the Internet. Often these web servers are provided by the ISPs, although a computer system can be set up and connected to the Internet without that system being also an ISP as is well known in the art. Embodiments may further utilize one or more load balancers to manage traffic to one or more instances of a collaboration server.

One or more client devices, indicated as 104 and 106 may be connected to network 124 via a wired or wireless interface. Client devices 104 and 106 may include a mobile computing device such as a smartphone or tablet, a laptop computer, a desktop computer, watch, and/or any other suitable computing device (e.g., a smart projecting wearable device). The client-server architecture allows a user to remotely access features of the collaboration server 102. According to an embodiment, client devices 104, 106 include one or more processors 107, one or more memories 108, one or more displays 109, and/or one or more graphical user interfaces 110. According to an embodiment, the graphical user interface 110 is coupled to the display 109.

Embodiments of the present invention may utilize a JavaScript Object Notation (JSON) web service to make a JSON call to the collaboration server 102. In some examples, the JSON call is made using XML HTTP, which implements an XML HTTP object that has functionality enabling the exchange of Extensible Markup Language (XML) data directly over the Internet using the Hypertext Transfer Protocol (HTTP). The XML HTTP object allows access of the collaboration server data, parsing the data using an XML Document Object Model (DOM), and posting XML data through a standard firewall directly to an HTTP server. In some embodiments, HTML5, Bootstrap, CSS3 Ecmascript, and/or Ember.js, Python/Django and/or Angular JS may also be used.

Some embodiments may further utilize a Structured Query Language (SQL) database for storage and retrieval of program application data. A variety of data store technologies may be used, including, but not limited to, PostgreSQL, Redis, and/or Elasticsearch.

The collaboration server 102 may be connected to a plurality of networked databases. One such database may include Geographic Information Systems (GIS) database 158. The GIS database 158 may include a record for geographical coordinates, addresses, roads, national boundaries, zoning categories (commercial, industrial, residential, farmland, forest, etc.), climate information, soil information, landscape/terrain information, and/or other pertinent information.

Another database may include services database 160. The services database 160 may include multiple database records storing profile entries for firms, professionals, knowledge workers, and/or amateurs. For each firm and/or individual in the services database 160, a record with fields such as specialization, location, cost, size, professional experience, number of projects worked on, number of followers, number of blog posts, and/or other fields is stored. This allows the collaboration server 102 to perform a sorting of a result set based on ranking criteria. The ranking criteria can include, but is not limited to, a number of social media followers of an account associated with one of the profile entries, a previous employer of an account associated with one of the profile entries, and/or a number of projects associated with an account associated with one of the profile entries.

Additionally, the collaboration server may be interfaced to one or more social media systems, indicated as 156 and 162 via network 124. In embodiments, records from social media systems such as Facebook®, Whatsapp®, Viber®, ICQ®, Quota®, Podio®, telegram.org®, basecamp3®, wrike®, Slack®, WeChat®, Xing®, VPN®, researchgate.net and/or LinkedIn® may be accessed by the collaboration server 102 via published Application Programming Interface (API) calls. In this way, searches initiated by the collaboration server can access information from existing social media systems and directly connected to operant/bubble tag(s).

Additionally, the collaboration server may be interfaced to one or more posting systems, indicated as 153 and 154 via network 124. In embodiments, records from posting systems such as Indeed™, Monster, and/or other employment listing systems may be accessed by the collaboration server 102 via published Application Programming Interface (API) calls. In this way, searches initiated by the collaboration server can access information from existing posting systems.

Additionally, the collaboration server may be interfaced to one or more search engines, indicated generally as 161. The search engines may be indexed search engines for general internet content, and/or specialized search engines, such as for legal databases, regulation databases, and/or other corpuses. These can provide data to the collaboration server in response to various search queries.

With seamless integration into a variety of systems, the collaboration server is able to provide timely and concise information regarding a variety of business applications to users via client devices. Disclosed embodiments enable the connecting of the world of amateurs and knowledge workers. This provides the ability to improve the quality of living and collaboration for all parties (amateurs, intelligences, and knowledge workers (kw)). This can be applied to a variety of industries, including, but not limited to, healthcare, banking, legal, and/or public administration, and can serve to reduce the overhead of any company.

Figure 5:
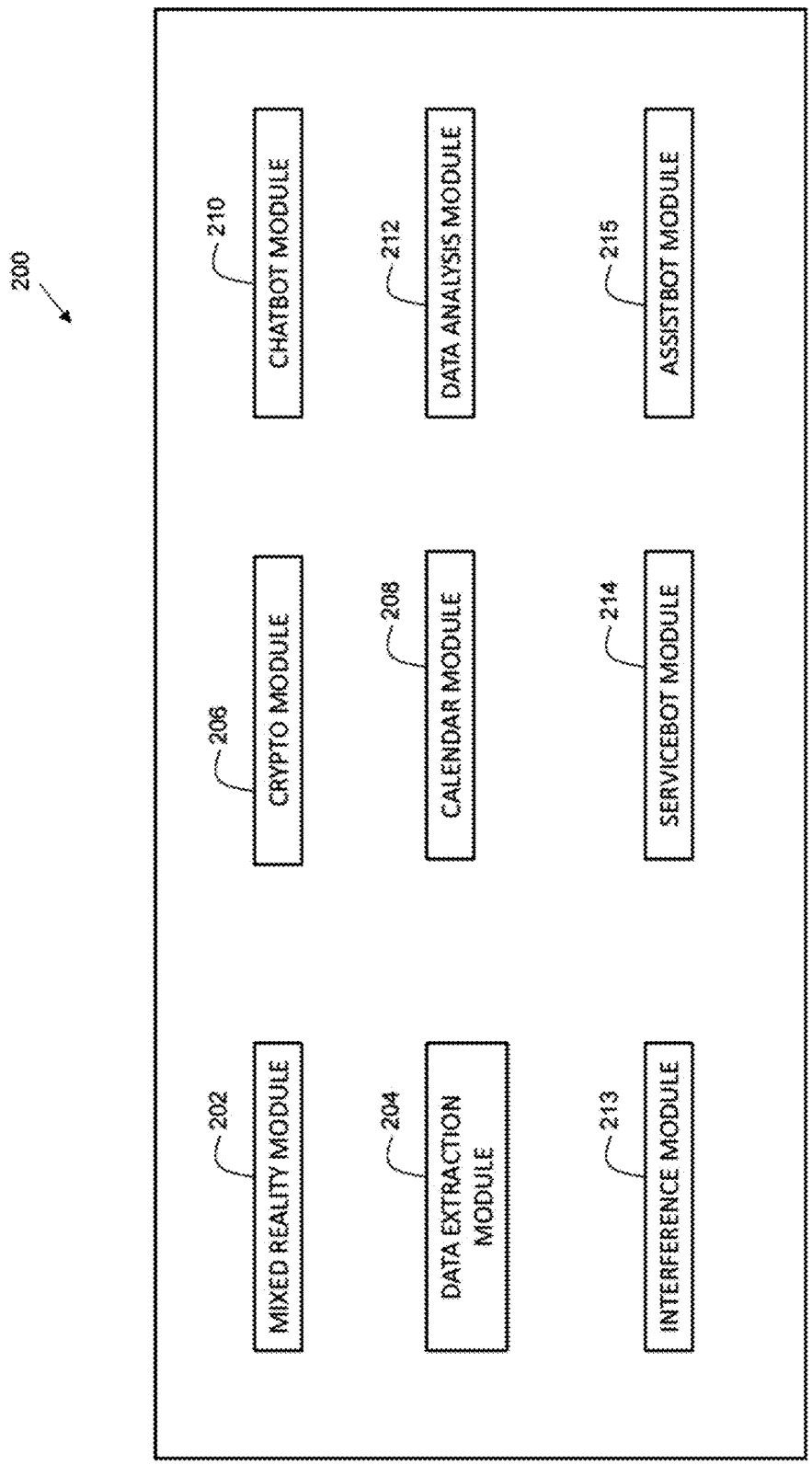
FIG. 5 is a block diagram of modules in accordance with embodiments of the present invention.

FIG. 5 is a diagram 200 of modules in accordance with embodiments of the present invention. In embodiments, the modules may be implemented via software executing on collaboration server 102 and/or associated client devices. In some embodiments, one or more of the modules shown in FIG. 5 may be implemented in software, dedicated hardware, or a combination of both hardware and software. The modules can include a mixed reality module 202. The mixed reality module 202 can render a display on a client device that is a mixture of real-world images and virtual objects and information superimposed on the real-world images. This opens up many possibilities in terms of commercial and social applications The modules can include a data extraction module 204. This can include software and/or hardware functionality for extracting data from websites, social media systems, posting systems, marketplace systems, government databases, and/or other repositories of information. This information can be used in intelligent searches, natural language processing, and/or other applications.

The modules can include a crypto module 206. The crypto module may provide networking constructs enabling distributed redundancy with no single point of failure, such as theCwind service chains/hashgraph chains and/or blockchains. Similar to a ledger, theCwind/hashgraph/blockchain records and indexes each movement of an entity, creating a searchable database of every transaction in the process. However, unlike traditional digital ledgers that record information on a central server, theCwind service chain/hashgraph chain/blockchain stores transaction data across vast networks of computers that constantly check and verify information with each other. Furthermore, it offers transparency since data is embodied within the entire network and thus, is public. Each record or transaction is furthermore resistant to corruption or unauthorized altering of contents due to the decentralized nature of the network. Embodiments of the present invention may utilize theCwind service chains/hashgraph chains/blockchains for tracking transactions such as payments in cryptocurrencies, digital deliverables, and/or other business/consumer transactions.

The modules can include a calendar module 208. The calendar module 208 can include functionality for tracking dates, meetings, appointments, travel schedules, and/or project schedules. The dates can include deliverable dates for deliverables provided by various knowledge workers engaged in a project.

The modules can include a chatbot module 210. The chatbot module may utilize natural language processing to provide communication to a human user. In embodiments, the chatbot may provide textual responses utilizing an instant messaging type of communication. In embodiments, natural language processing (NLP) may be used to extract information from a text input from a human user, and generate a corresponding response. In embodiments, the natural language processing can elude, but is not limited to, categorizing of content, entity extraction, clustering content, fact extraction, and/or relationship extraction. The natural language processing can be used for tasks such as social media monitoring, formulating responses to questions, text analytics, and/or big data applications.

In embodiments, the chatbot can be used to handle initial contact with a human user, provide initial information, and then transfer the conversation to a live human once the initial information is provided. In embodiments, the chatbot may be used for formulating responses to questions, customer service applications, and/or reminder and follow-up applications, among others.

The modules can include a data analysis module 212. The data analysis module 212 can be used to parse data from social media postings, instant (registered) messages, e-mail communications, and/or other forms of digital information. The data analysis module 212 may analyze information suitable for use in dashboards and/or other graphical representations.

The modules can include an interference module 213. In embodiments, the interference module 213 may show personalized operant/bubble tag sequences/chains in contrast to standard and community shared (trusted) operant/bubble tag sequences/chains.

The modules can include a servicebot module 214. In embodiments, the servicebot module 214 may show the team or enterprise workflow or process map based on operant/bubble tags and its time and location coincidences to the team operant/bubble tags.

The modules can include an assistbot module 215. In embodiments, the assistbot module 215 may show the personal workflow and personal work cycles based on operant/bubble tags in context of all operant/bubble tag defined situations (at work, at home, on the way home, on the way to work, or other circumstance and sub-circumstances). Inputs to these situational operant/bubble tags are changes in time and location, user activities or other shared activities, IoT, NFS pattern recognition e.g. WLAN, RFID detection, Geolocalization and Voice recognition.

Figure 6:
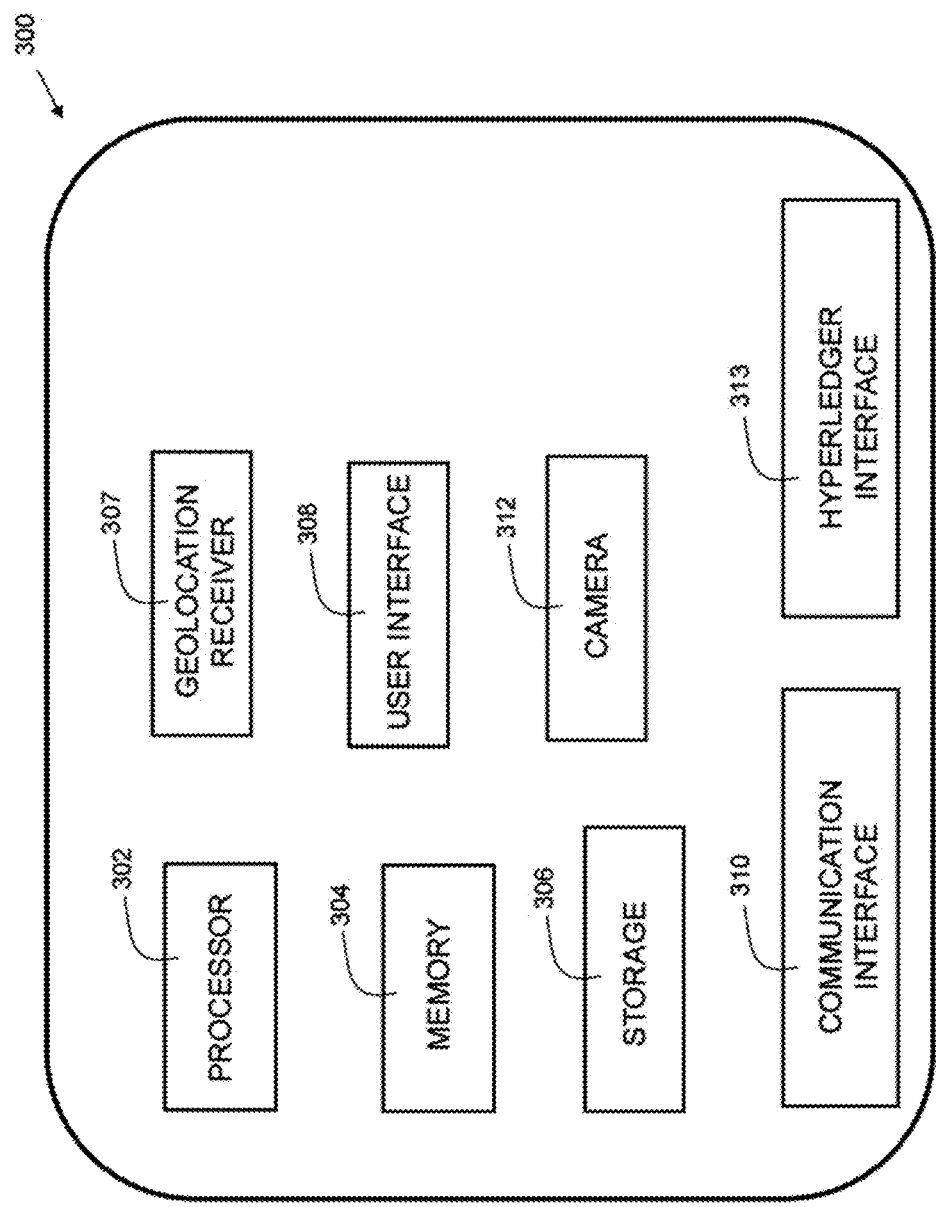
FIG. 6 is a diagram of a client device in accordance with embodiments of the present invention.

FIG. 6 is a block diagram of a client device 300 in accordance with embodiments of the present invention. In embodiments, client device 300 is an electronic device that may include a desktop computer, laptop computer, tablet computer, watch, smartphone, and/or other suitable wearable client device. Client device 300 may be similar to client device 104 or 106 as shown in FIG. 4. Client device 300 includes a processor 302, a memory 304 coupled to the processor 302, and storage 306. The memory 304 may be a non-transitory computer readable medium. Memory 304 may include RAM, ROM, flash, EEPROM, or other suitable storage technology. The memory 304 contains instructions, that when executed by processor 302, enable communication to/from collaboration server 102 of FIG. 4. Client device 300 further includes a network communication interface 310 for performing this communication. In embodiments, network communication interface 310 includes a wireless communications interface such as a cellular data interface and/or a Wi-Fi interface. In embodiments, the storage 306 includes flash, SRAM, one or more hard disk drives (HDDs) and/or solid state disk drives (SDDs).

Device 300 further includes a geolocation receiver 307. Geolocation receiver 307 can operate with a satellite-based location system such as Global Positioning System (GPS), Galileo, GLONASS, or other system now known or hereafter developed. The geolocation receiver 307 enables a mobile device to be location aware, enabling various applications of disclosed embodiments, including, but not limited to, mixed reality applications (e.g. Google maps, GPS, Camera input).

Device 300 furthers includes a user interface 308. User interface 308 may include a keyboard, monitor, mouse, and/or touchscreen, and provides a user with the ability to enter information as necessary to utilize embodiments of the present invention. In embodiments, a user uses the device 300 to access the functionality of the collaboration server 102. Device 300 further includes a camera 312. The camera 312 may be used to acquire real-world images for use in mixed reality applications. Device 300 may further include a Hyperledger interface 313. Embodiments may utilize a crypto technology built using Hyperledger Fabric or e-ID for backend functions, such as keeping a ledger of encrypted data's IDs and storing records of consent. This provides numerous advantages. First and foremost, it allows for permissioning control. Second, there are no gas costs associated with crypto technology because they use predefined verified nodes. That way every time a record is accessed or updated, it doesn't cost money. Third, it allows the platform to verify transactions at greater speeds. Thus, disclosed embodiments provide a system to manage permission and keep immutable records of activities pertaining to those transactions.

Figure 7:
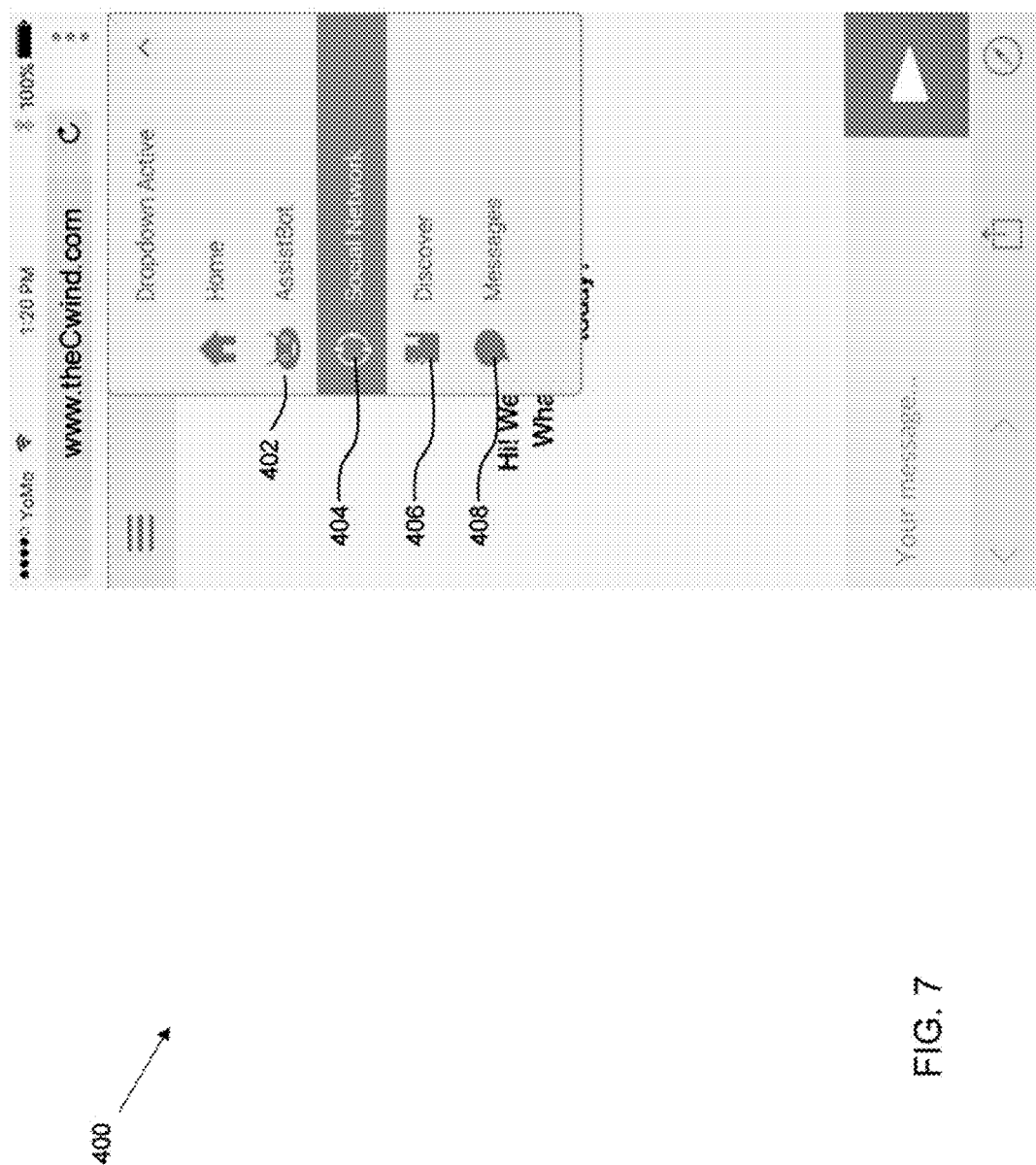
FIG. 7 is an exemplary user interface showing item selection in accordance with embodiments of the present invention of an information and service sharing center.

FIG. 7 is an exemplary user interface 400 showing item selection in accordance with embodiments of the present invention of an information and service sharing center. Interface 400 includes a dropdown menu with a variety of options, including assistbot 402, which allows access to bot configuration options. The dropdown menu may further include a social network option 404, which allows access to social network, chatbot and servicebot preferences such as privacy and notification options. The dropdown menu may further include a discover option 406, which allows access to discover preferences in mixed-reality such as privacy settings, public profile information, and/or other attributes. The dropdown menu may further include a messages/information channel option 408, which allows access to messages/information channel options such as fonts, audible alerts, emoji representations, D-emoji representations, automatic multi-language-translation options, and/or other messaging/operant/bubble tag interferences, cross-service options and prosumer/service provider adopted menus based on operant/bubble tag(s).

Figure 8:
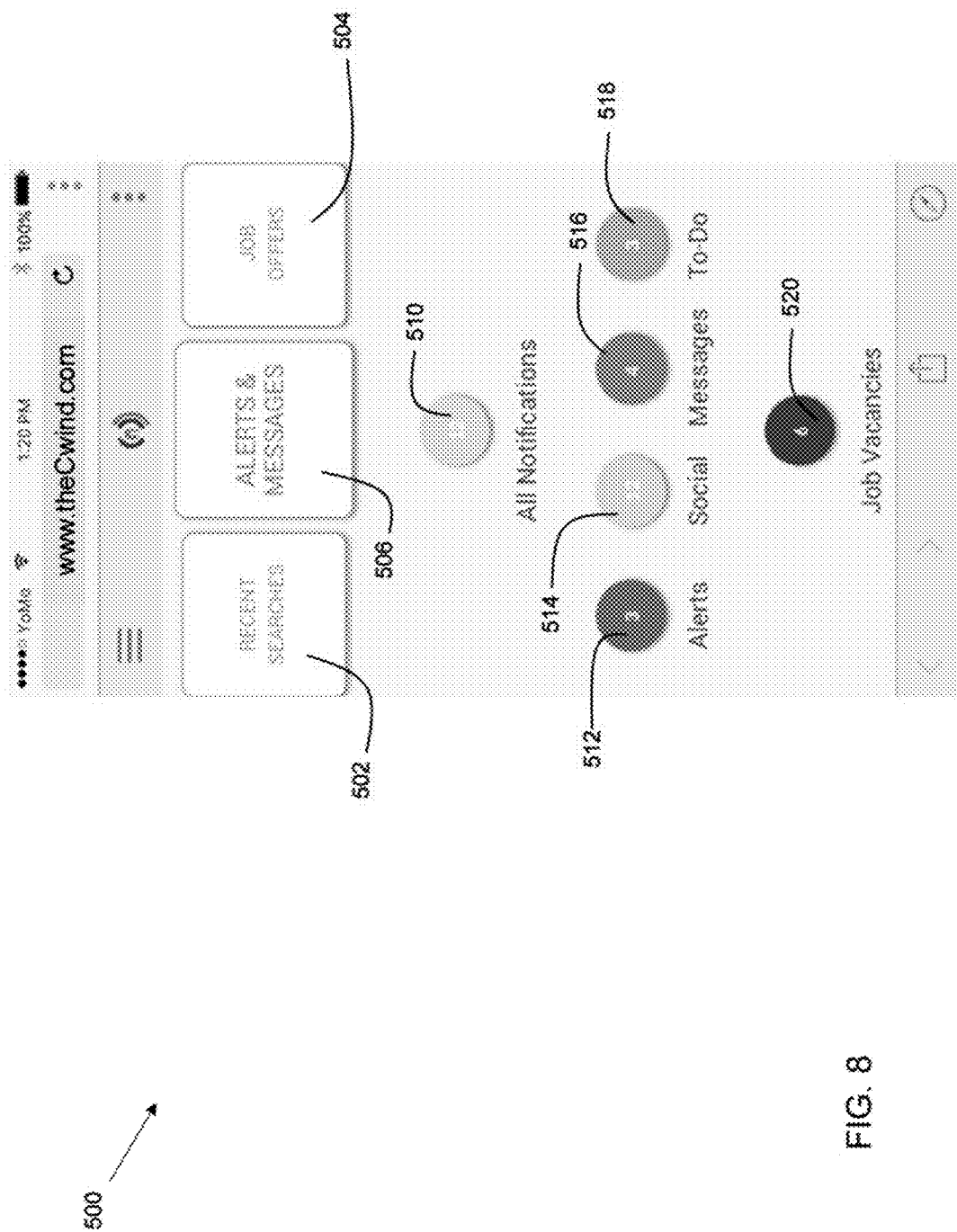
FIG. 8 is an exemplary user interface showing notification types in accordance with embodiments of the present invention of a newsfeed, workfeed, and/or servicefeed for issue-specific sharing or collaboration with a specific sharing level.

FIG. 8 is an exemplary user interface 500 showing notification types in accordance with embodiments of the present invention of a newsfeed, workfeed, and/or servicefeed for issue specific sharing or collaboration with a specific sharing level. A top row of buttons includes button 502 for display of recent searches, button 506 for display of alerts and messages, and button 504 for display of job offers.

The notifications can be filtered by a variety of topics. Control 510 enables display of all notifications. Control 512 allows display of alerts. Control 514 allows display of social media notifications. Control 516 allows display of messages. Control 518 allows display of To-Do list notifications. Control 520 allows display of job vacancies. In embodiments, the number of each type of message is shown in the corresponding control. For example, there is a number "6" in the job vacancies control 520, indicating that six job vacancy notifications are available. In embodiments, a user may select more than one control, allowing for complex filtering of notifications. For example, a user selecting control 512 and control 520 has configured the system to provide messages regarding alerts and job vacancies, while filtering out other types of messages.

Figure 9:
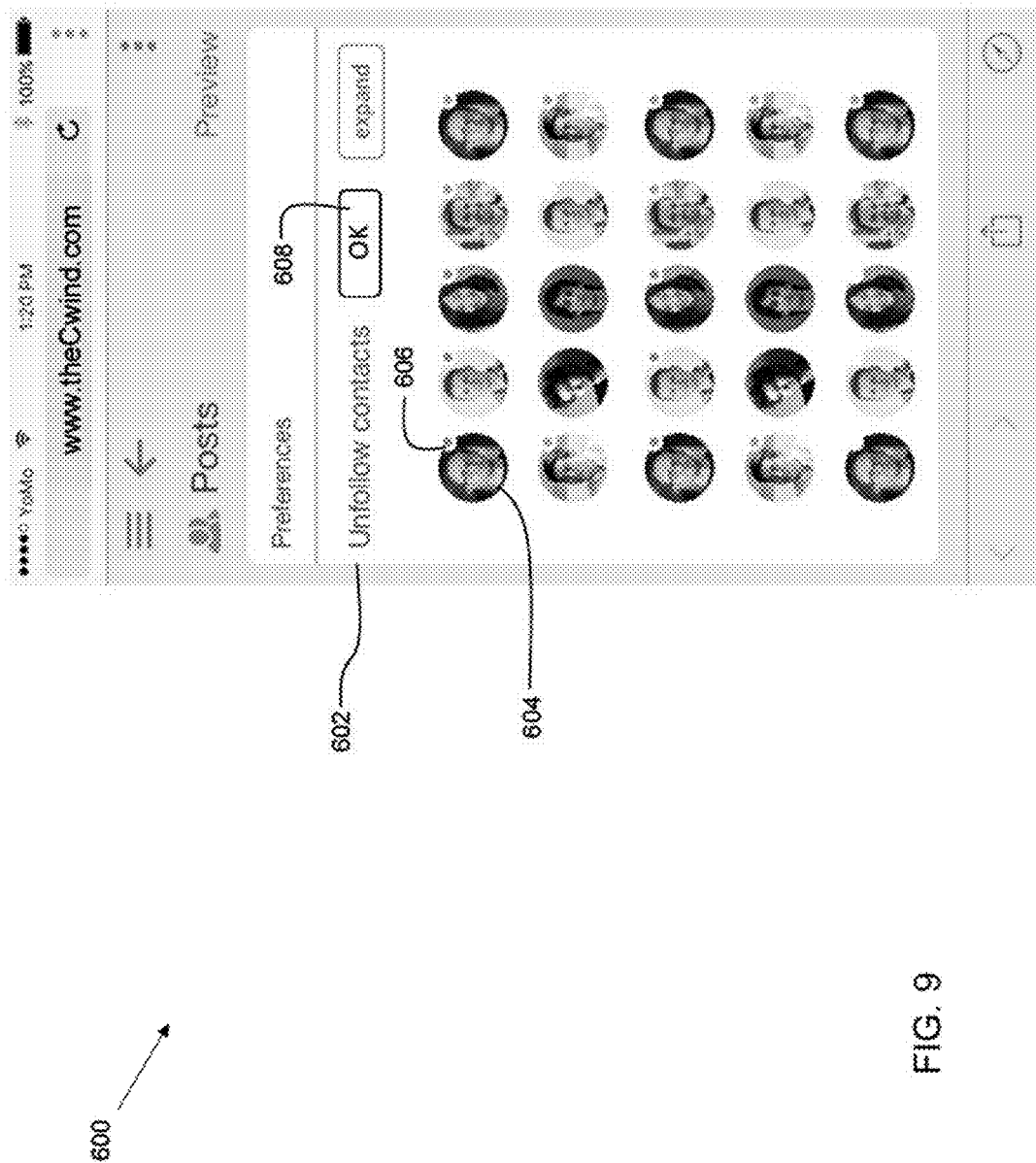
FIG. 9 is an exemplary user interface showing a group contact action in accordance with embodiments of the present invention.

FIG. 9 is an exemplary user interface 600 showing a group contact action in accordance with embodiments of the present invention. A group contact action 602 determines which action is to be performed. In embodiments, each contact is shown as an icon, indicated generally at 604. Each icon may include a photo, avatar, initials, or other indication of the user. Additionally, a communication status indicator 606 may be present for some or all of the contacts. In embodiments, the communication status indicator 606 may utilize a different color and/or pattern to indicate an online status, an away status, an offline status, a busy status, a do not disturb status, and/or other suitable status. A user may select one or more contacts (e.g. by clicking or otherwise selecting the icon) and then perform the action by invoking the OK button 608. Note that while the action of "unfollow contacts" is shown in FIG. 9, in embodiments, other actions are possible. These actions can include, but are not limited to, sending a message, updating a status, and/or other suitable action.

Figure 10A:
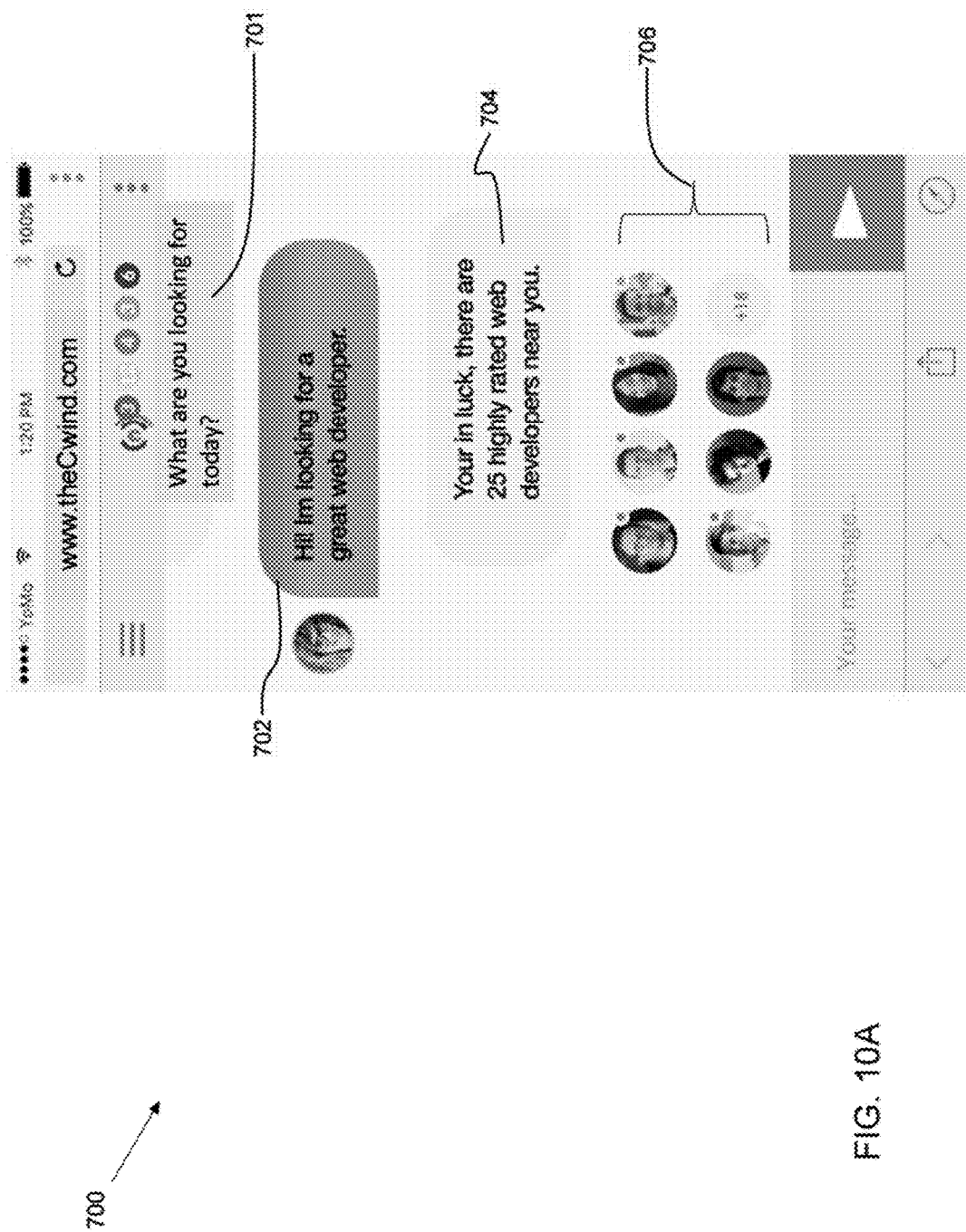
FIG. 10A and FIG. 10B show a communication flow in accordance with embodiments of the present invention.
Figure 10B:
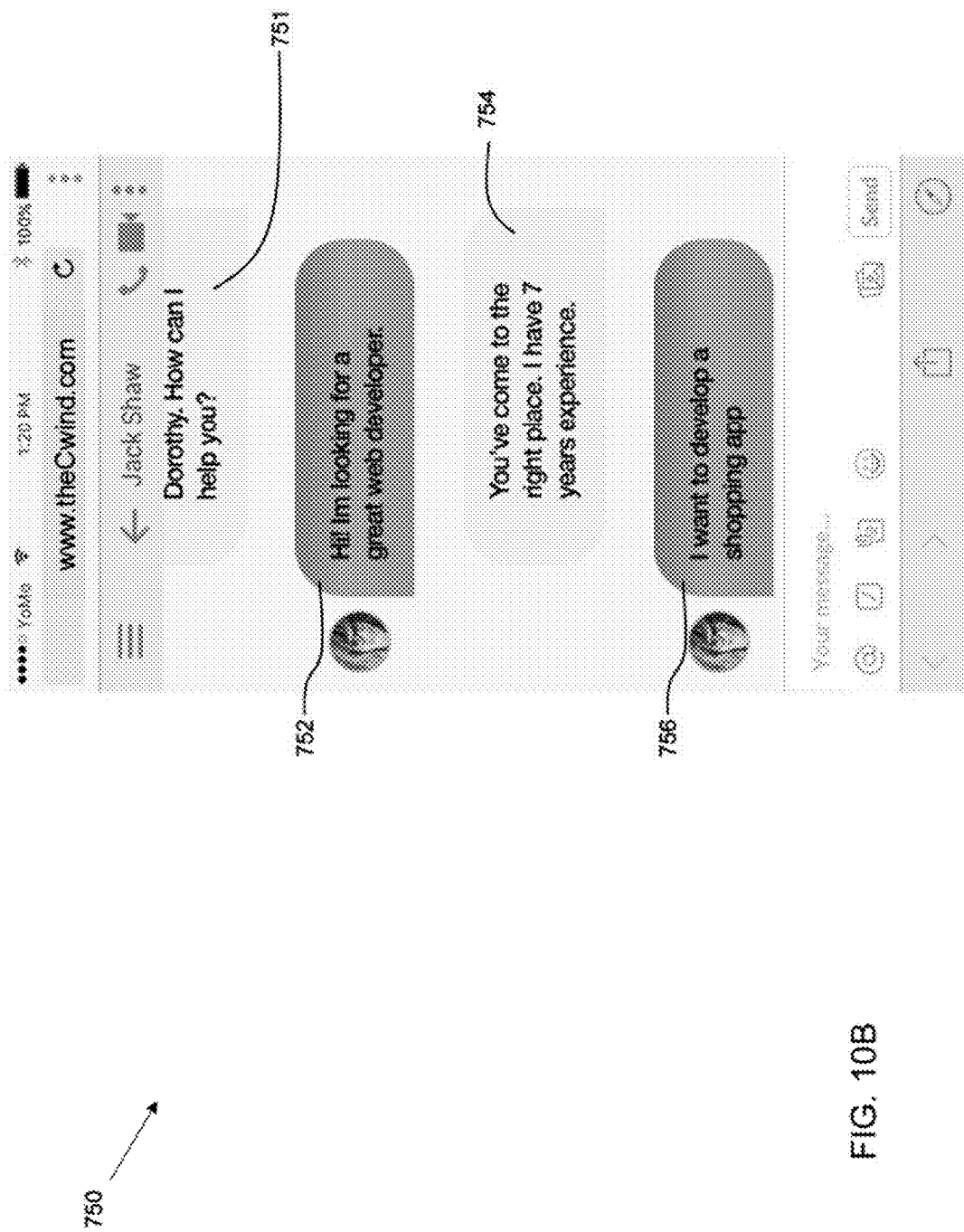

FIG. 10A and FIG. 10B show a communication flow in accordance with embodiments of the present invention. Referring now to FIG. 10A, user interface 700 shows text 701 originating from the collaboration server with the question "What are you looking for today?" In embodiments, question text 701 may originate from a chatbot. A live user then replies with the statement shown at 702. Natural language processing may then process statement 702, and extract the topic of web developer. The chatbot may then reply with statement 704, indicating a number of web developers that match certain criteria. The criteria can include, but is not limited to, geographic proximity, expertise, ratings, experience level, previous employment experience, and/or other factors.

The system may then provide information grid 706 including the list of profile entries matching the criteria, which may be ranked according to relevance, geographical location, hourly rate, and/or other suitable criteria.

Referring now to FIG. 10B having user interface 750, the live user can then initiate contact with one of the profile entries shown in grid 706. The live user associated with the profile entry may respond at 751. The conversation continues with the user seeking knowledge worker services responding at 752. At 754, the knowledge worker responds with his/her experience level, and at 756, the user seeking knowledge worker services responds, and the conversation may continue, possibly culminating in an offer for services. Thus, embodiments can include, generating an offer; and sending the offer to an account associated with a profile of the one or more profile entries. Embodiments can further include receiving an acceptance for the offer. Embodiments can further include receiving a rating for the service once the service is complete. Embodiments can further include storing the rating in a database for future reference. In embodiments, the rating may be provided by the user sending an emoji, or a de-emotionalized emoji (D-emoji, D-emoticon). Emojis are universal, and one of the more prevalent international languages used in the world today. Since emojis are often associated with emotions, using a conventional emoji may skew a user rating. Disclosed embodiments may provide one or more D-emojis/D-emoticons, which may include emoji-sized icons of multilingual semantic words (e.g. YES/NO) or other symbols that do not represent a face, thereby potentially soliciting a more objective review of services. Examples of such D-emojis/D-emoticons based on conditioned and connected operant/bubble tags are shown in the user interfaces of FIG. 10C-10O.

Figure 10C:
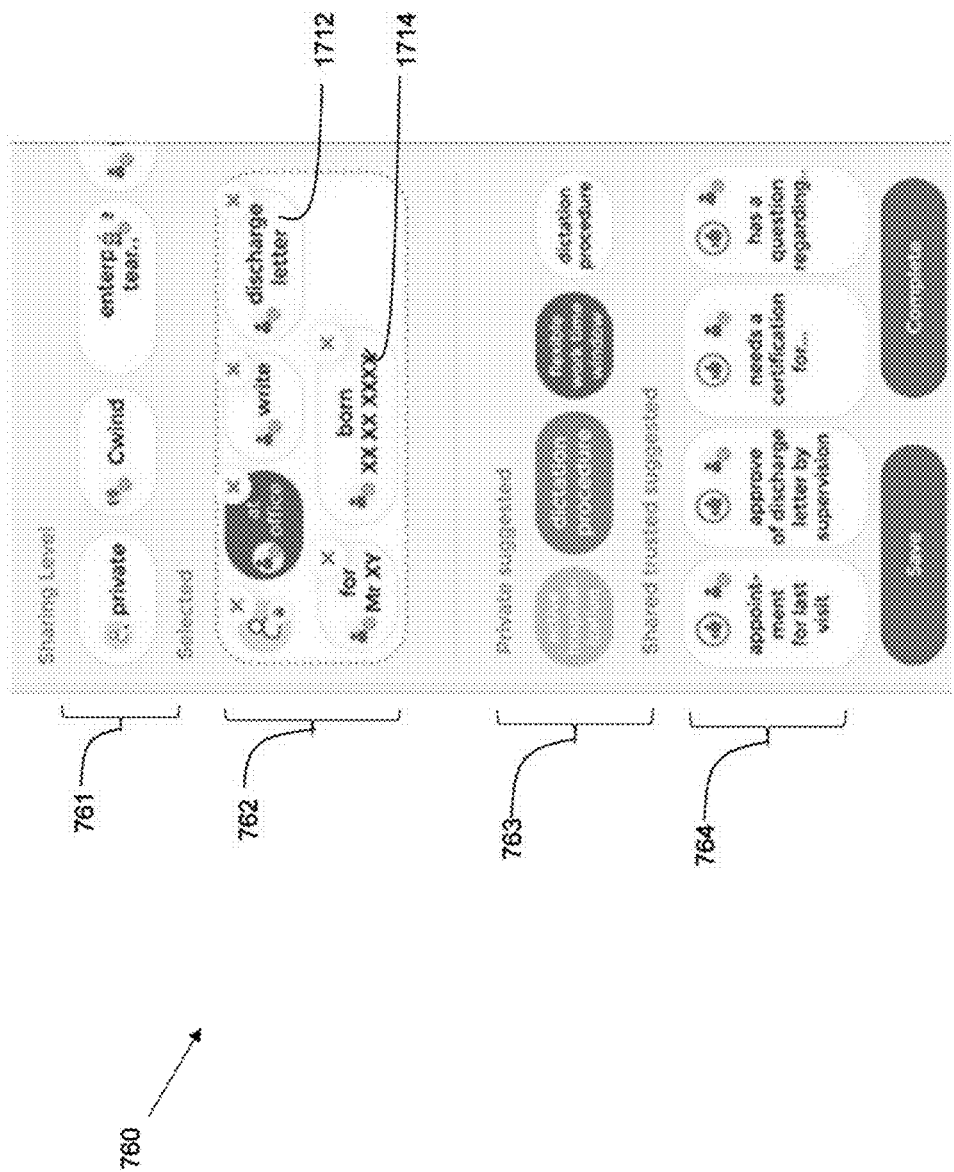

Referring now to FIG. 10C, a user interface 760 is shown indicating multiple groups of D-emojis/D-emoticons. Group 761 includes privacy-based D-emojis/D-emoticons, with options to allow selection of a group for sharing communication. Group 752 includes content-based D-emojis/D-emoticons, including subject clauses such as "discharge letter" 1712 and "born date" 1714. These content-based D-emojis/D-emoticons may be context specific. As an example, a physician that needs to draft numerous discharge letters may utilize similar subject clauses frequently. In embodiments, machine learning and artificial intelligence techniques may be used to learn over time, which D-emojis/D-emoticons a user needs most frequently, and suggest those D-emojis/D-emoticons accordingly.

Group 763 indicates private suggested D-emojis/D-emoticons including procedures. Group 764 indicates shared trusted suggested D-emojis/D-emoticons for other subjects and/or requests. The D-emojis/D-emoticons shown in this user interface are exemplary, and other D-emojis/D-emoticons may be used in other industries and/or applications.

Figure 10E:
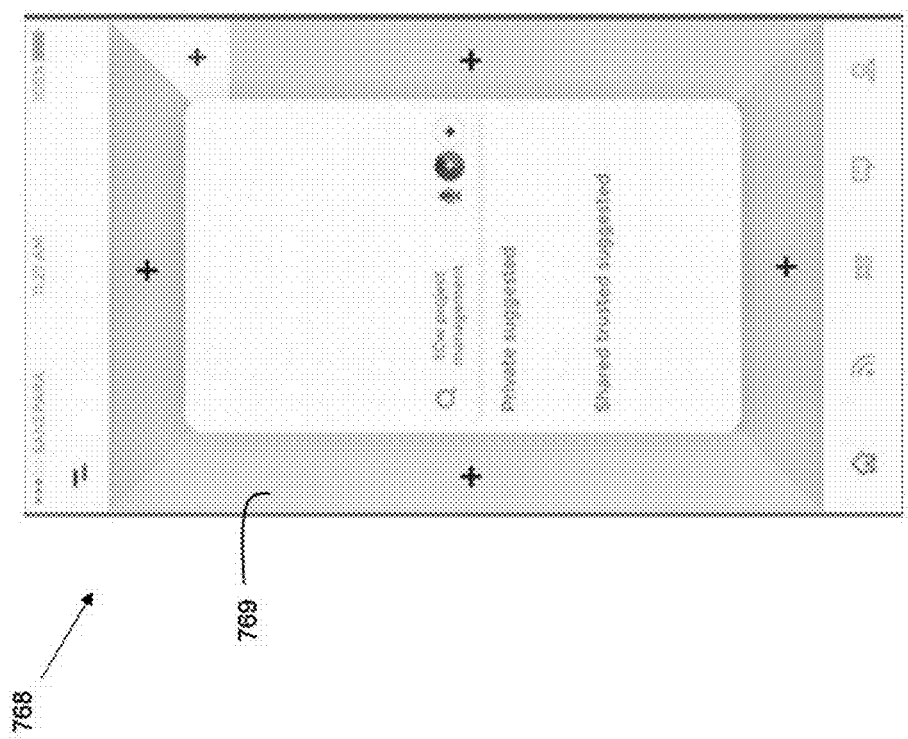
Figure 10D:
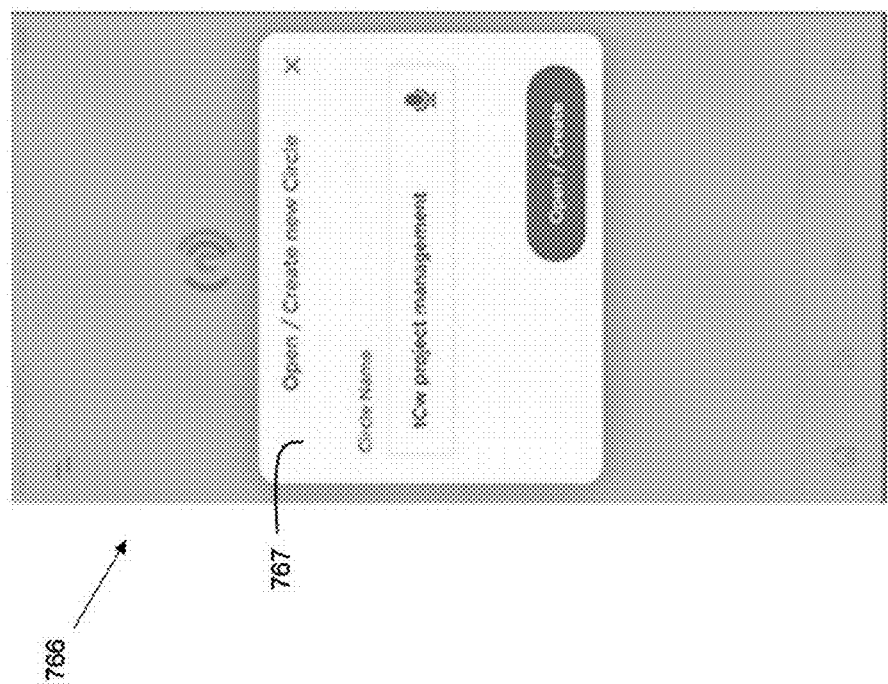

Referring now to FIG. 10D, user interface 766 is shown with dialog window 767 used for opening or creating a new circle. In disclosed embodiments, a "circle" is a construct used for enhanced organizational efficiency. Referring now to FIG. 10E, a user interface 768 shows the creation of a new circle, indicated by frame 769. As shown in FIG. 10E, frame 769 is part of a new circle, and has no operant/bubble tags.

Figure 10G:
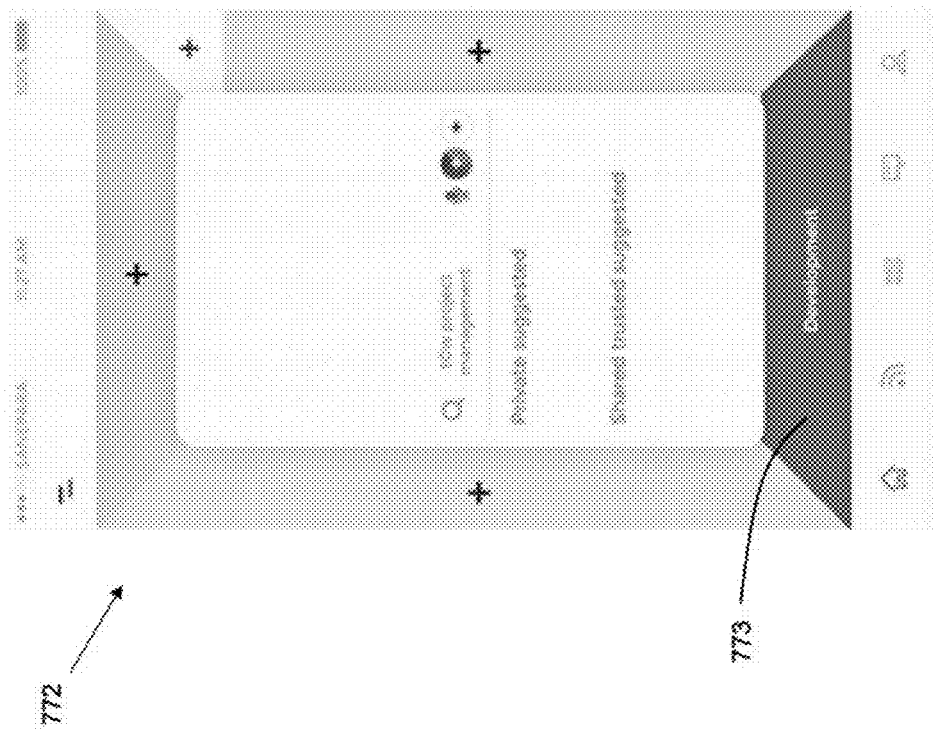
Figure 10F:
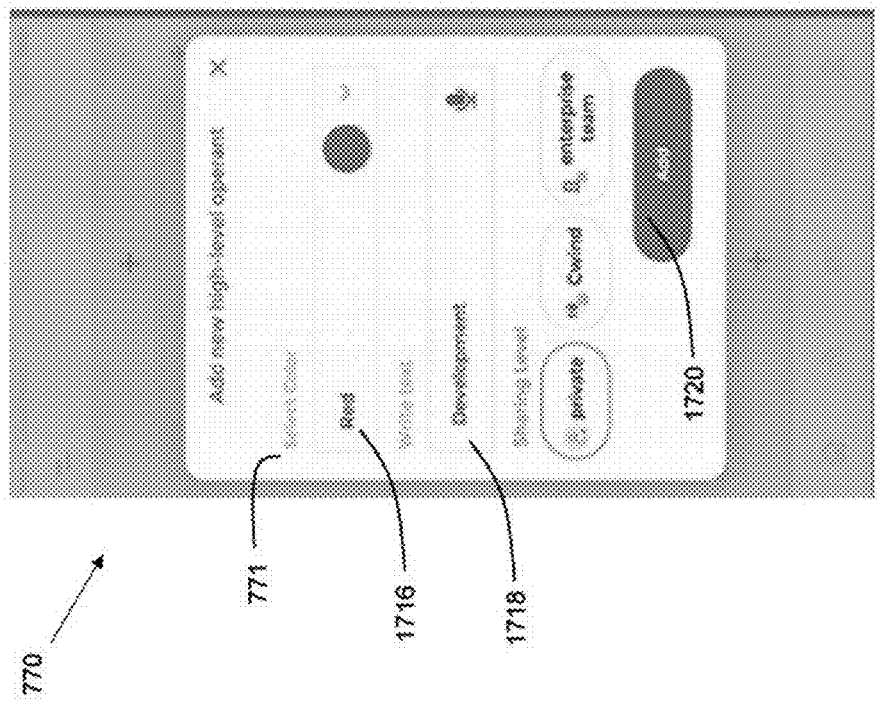

FIG. 10F shows user interface 770 with dialog box 771 for adding a new high level operant/bubble tag. The user may select a color in field 1716, and an operant/bubble tag name in field 1718. Once the user selects the Add button 1720, the user is presented with the user interface 772 of FIG. 10G, showing a graphical representation of the operant/bubble tag at segment 773.

Figure 10I:
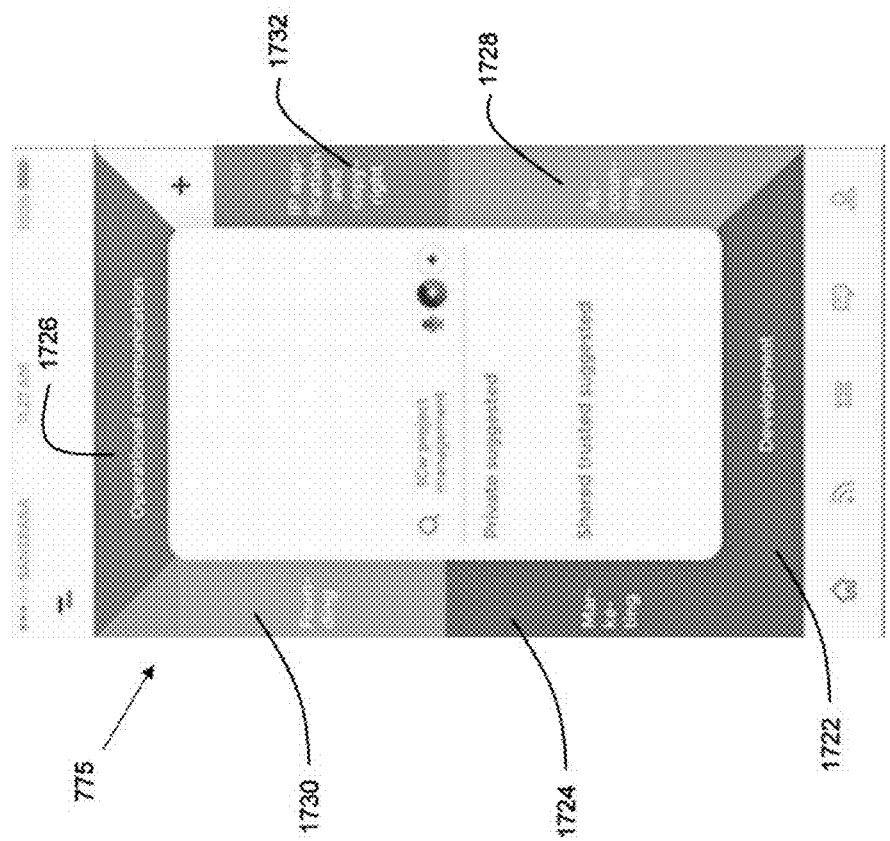
Figure 10H:
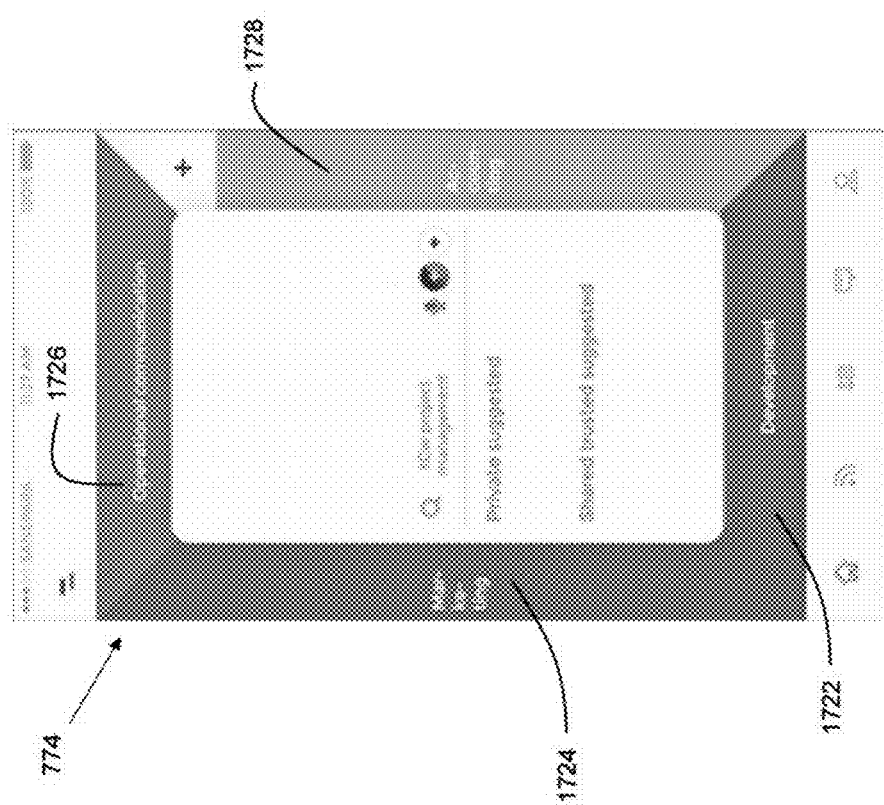
Figure 10K:
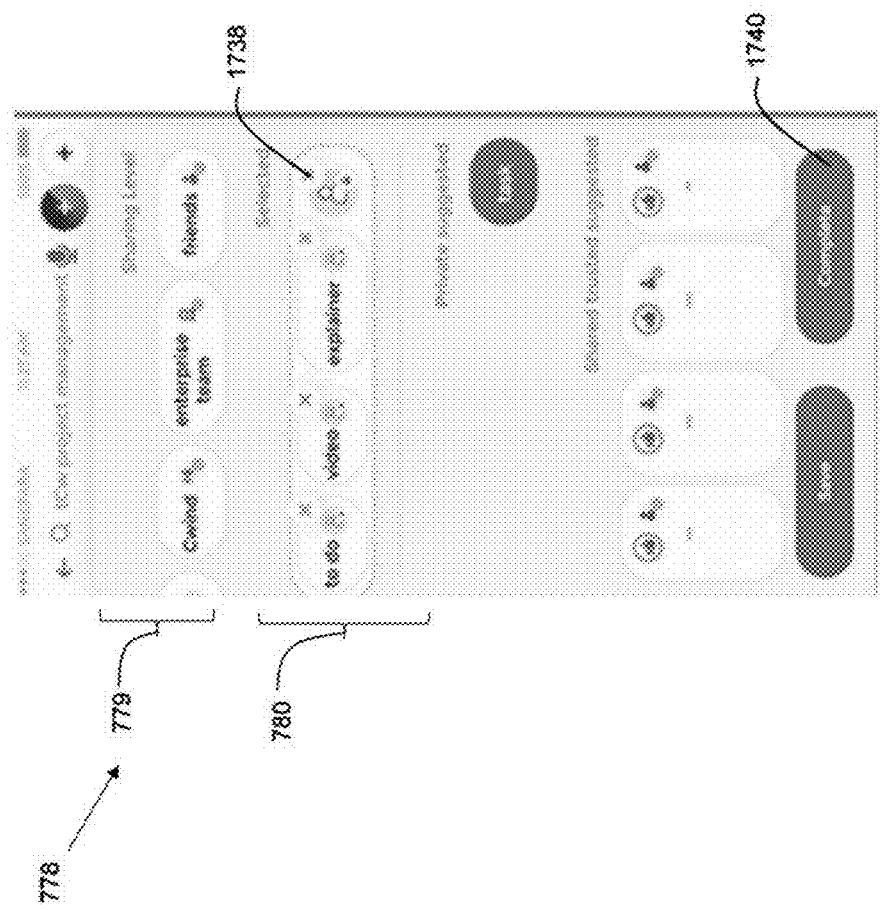

FIG. 10H shows user interface 774 indicating a circle with four operant/bubble tags. Development 1722, Marketing 1724, Operational Communication 1726, and Accounting 1728. More operant/bubble tags can be added. FIG. 10I shows user interface 775 indicating a circle with six operant/bubble tags, Development 1722, Marketing 1724, Operational Communication 1726, Accounting 1728, Founding 1730, and IP application and copyright 1732.

Figure 10J:
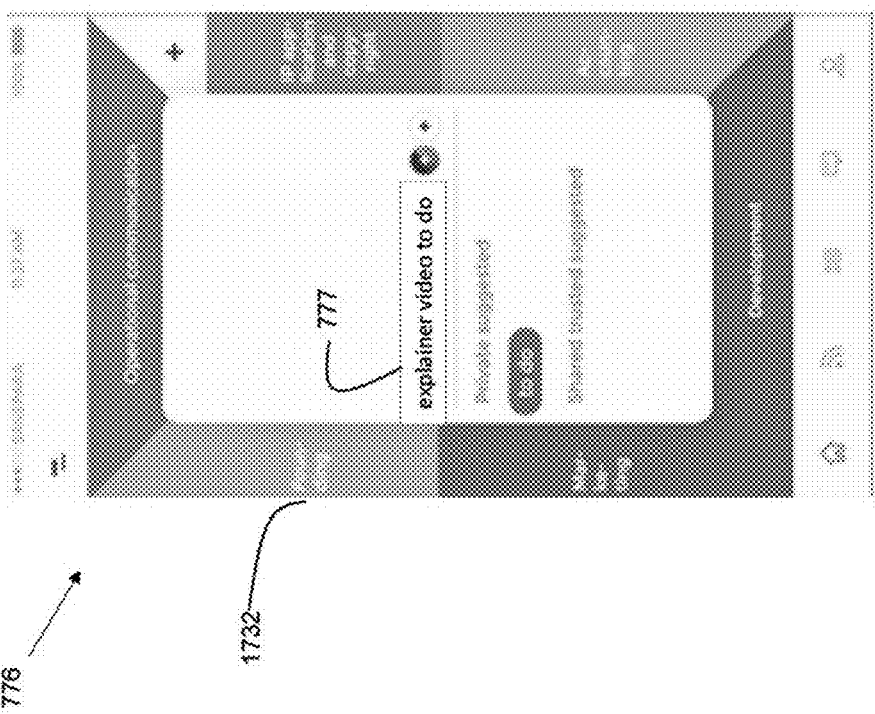

FIG. 10J shows an example of a user interface 776 with a task entry 777 entered within the frame 1732. The user may then be presented with user interface 778 of FIG. 10K. This shows group 779 of D-emojis/D-emoticons indicating sharing settings, and group 780 of D-emojis/D-emoticons based on the task entered at 777 in FIG. 10J. In embodiments, natural language processing may be used to perform entity detection, topic extraction, disambiguation, and/or other processing functions to generate the D-emojis/D-emoticons presented in group 780. The user can remove one or more of the suggested D-emojis/D-emoticons by tapping/ selecting the X in the corner of each D-emojis/D-emoticons and example of which is indicated by reference 1738. Once the user has the desired set of D-emojis/D-emoticons, after deleting any, the user then invokes the Complete button 1740 to proceed to the next step, as indicated in FIG. 10L. FIG. 10L shows user interface 781 with additional D-emojis/ D-emoticons that may be suggested, as indicated by reference 782. The user invokes the Complete button 1742 to proceed to the next step, as shown in FIG. 10M. FIG. 10M shows user interface 784 with group 785 of D-emojis/D-emoticons including prioritization and categorization. Group 786 includes D-emojis/D-emoticons suggested for drafting a communication based on the entered task, and can include items such as contact information (phone numbers, e-mail, etc.), expected duration of a call, and time preferences for communication.

Figure 10N:
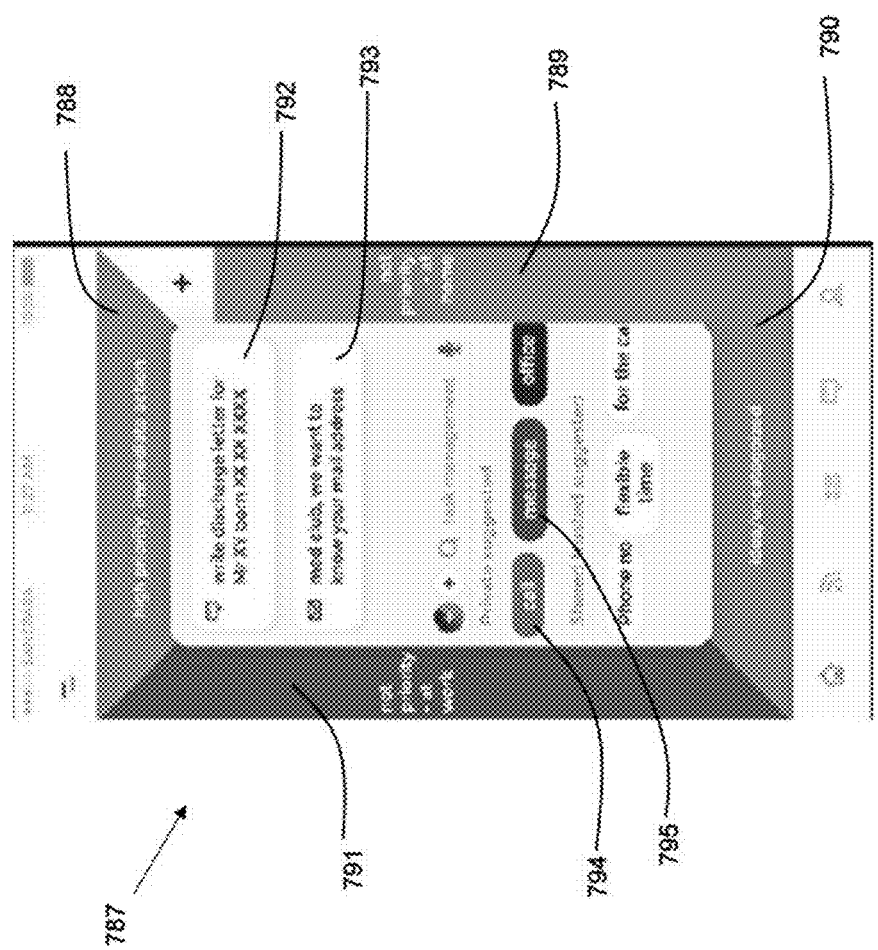

FIG. 10N shows user interface 787 indicating various communication activities that are displayed within the frame. The frame has four segments, including high priority 788, low priority home activity 789, low priority work activity 791, and uncategorized 790. Activities can include tasks such as task 792, and/or communication messages, such as e-mail 793. Reply options such as call 794 and/or messages 795 may also be presented. In embodiments, the communication activities can be assigned to a segment by selecting an activity and then selecting a corresponding segment. For example, for the message 793, about a request for a mailing address, a user can select that message 792, and then select segment 789 to classify the message as a low priority home activity. In this way, disclosed embodiments enhance task management and prioritization, leading to increased efficiency and time management.

Figure 10O:
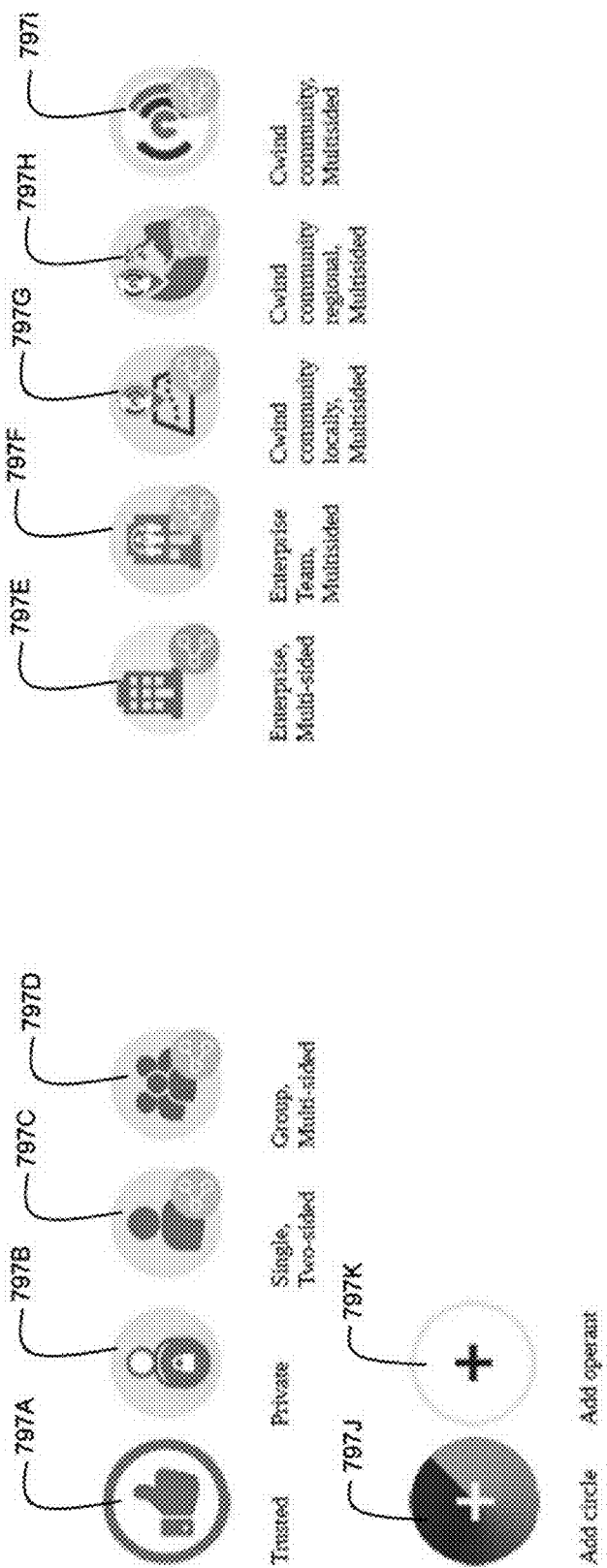

FIG. 10O shows examples of D-emojis/D-emoticons that may be present in some embodiments. Icon 797A shows an image representing trusted. Icon 797B shows an image indicating private. Icon 797C shows an image representing single, two-sided communication. Icon 797D shows an image representing group, multi-sided communication. Icon 797E shows an image representing enterprise, multi-sided communication. Icon 797F shows an image representing enterprise team, multi-sided communication. Icon 797G shows an image representing community local multi-sided, multi-sided communication. Icon 797H shows an image representing community regional multi-sided communication. Icon 797i shows an image representing community multi-sided communication. Icon 797J shows an image representing the add circle feature. Icon 797K shows an image representing the add operant/bubble tag feature. These icons are merely exemplary, and embodiments may have more, fewer, or different icons.

In embodiments, these D-emojis/D-emoticons based on operant/bubble tags (low level and high level operant/bubble tag(s), operant/bubble tag sequence(s)/chain(s) and operant/ bubble tag circle(s)) may be displayed in place of a traditional keyboard for purposes of rating services and/or other user experiences. operant/bubble tags visualize activity steps or workflow processes, that facilitate community flow games and cross services respectively. A multicolored "+" icon (797J of FIG. 10O) can be used to open/create a new circle e.g. "task management". A white "+" icon (797K of FIG. 10O) can be used to open/create a popup menu that allows any conditioning.

Each operant/bubble tag has a sharing level icon (FIG. 10O with private, friends (two-sided, multi-sided), groups (two-sided, multi-sided), enterprise (multi-sided icon) with defined content protection. For each operant/bubble tag sequence/chain, a sharing level with sharing level icon on top is defined as well. If a user taps on a sharing level (e.g. 'friends') then it popups a list of fiends whom the user can tag.

An operant/bubble tag sequence/chain contains an overall sharing level of the whole operant/bubble tag sequence/ chain; an operant/bubble tag with sharing level and content operant/bubble tag; an operant/bubble tag with sharing level with content; a semantic action/semantic service operant/ bubble tag. For each selected operant/bubble tag sequence/ chain private and shared trusted operant/bubble tags are suggested. For any semantic entry a sequence/chain of operant/bubble tags is created. E.g., any note will automatically be divided into connected operant/bubble tags and added to the end of the raw "Selected". But any (large) operant/bubble tag sequence/chain can be subdivided (by fingertip selection) into several sub-operant/bubble-sequences/chains (each with heading high level operant/ bubble tag). e.g. a whole text of a letter will be divide by the app into connected operant/bubble tags and at the end structured into high-level semantic-parts. On the other hand, any semantic operant/bubble tag can be fused to one operant/bubble tag by drag&drop.

According to the defined operant/bubble tags on the raw "Selected," the app will find matching information with the "private database" on the raw "Private suggested" and with the shared operant/bubble tags of the community on the raw "Shared trusted suggested".

The operant/bubble tags in the raw "Selected" should have no double in the raw "Private suggested" and no double in the raw "Public trusted suggested". Each raw with operant/bubble tags/operant/bubble tag sequences/chains is horizontally scrollable. Each high level operant/bubble tag on the screen has different colors (colors occur in a predefined order e.g. blue, green, violet, green, yellow etc.) but in some embodiments, the color of a high level operant/bubble tag can be user defined and fixed. A white or low level operant/ bubble tag becomes a high-level operant/bubble tag within the circle by swiping the operant/bubble tag over the multi colored "+" icon.

High level operant/bubble tags in an operant/bubble tag sequence/chain are represented by different colored operant/ bubble tags or as icons/symbols on top (instead of full colored operant/bubble tags. Icons are automatically used in the following situations: e.g. For each sharing level operant/ bubble tag; For each trusted operant/bubble tag sequence chain; For each private and active operant/bubble tag sequence/chain; For each private and inactive operant/ bubble tag sequence/chain; For each "device and channel" operant/bubble tag; For each "like" shared operant/bubble tag sequence/chain; For each "dislike" shared operant/ bubble tag sequence/chain.

Tapping once on an operant/bubble tag shows the details of the operant/bubble tag conditions. Tapping twice on an operant/bubble tag in a short interval divides the operant/ bubble tag into a connected operant/bubble tag sequence-chain.

Some standard menus are available for bottom icons: e.g. Home, Social Feed, Services, Service Feed, Profile including access to:

User activity/service profile(s)—the same user can have several trusted profiles and non-trusted profiles Sharing level specific newsfeed via news bat (like WhatsApp user to user, or user to user group)

Sharing level specific servicefeed via service bot; service tracking of workflow or activity flow of different sharing level, with task delegation and verification in context of operant/bubble tag(s) circle with status check & progress of task e.g. project management, task management; 1. Address "informed consent"/"task" operant/bubble tag to contact(s)/other sharing level with (without) deadline/timer with addressed feedback (when completed), full log protocol with location stamp and timestamp (encrypted ID and private key for offline or on the 'Hyperledger Fabric' for backend function on the crypto module, in a legally compliant way; 2. Shared Decision Making and Tracking (bi-directional): address "verified (sub-)task" operant/bubble to (same) contact/other sharing level with short deadline/timer with addressed feedback (when completed) about one specific operant/bubble tag in one sequence/chain, full log protocol with location stamp and timestamp (encrypted ID and private key for offline or on the 'Hyperledger Fabric' for backend function on the crypto module, in a legally compliant way); 3. Customer Relation Management with retargeting based on content marketing e.g. tracking of what user are sharing or need to share on/for provider services/products and interfaces or tracking what service provider is sharing. 4. (trusted) Voting/Survey (multi-directional): address operant/bubble tag based voting sequence/chain mean to address a verified task with bi-options/multi-options via questionnaire operant/bubble tag(s)→to trusted (two or multiple) contacts→with deadline/timer for voting→with addressed feedback (when completed) about one specific operant/bubble tag in one sequence/chain, full log protocol with location stamp and timestamp (encrypted ID and private key for offline or on the 'Hyperledger Fabric' for backend function on the crypto module, in a legally compliant way), e.g. survey or feedback form for 'influencer feedback' to the app.

Information sharing center/service sharing center

Operant/bubble tag (sequence/chain) in(ter)ferences menu of 2-/multiple (Semantic word operant/bubble tag or variable value) operant/bubble tag sequences/chains or part of operant/bubble tag sequences/chains in a grid of operant/bubble tags compared 1. to personal operant/bubble tags and 2. to theCwind community operant/bubble tags. e.g. search/interference/match job Menu for template selection of standard operant/bubble tag sequence(s)/chain(s) or circle library (followed by personalization)

ID specific protocol (with Hyperledger)

Mixed Reality (MR-) feed for any coincidence with the registered user based on operant/bubble tags; 1. View operant/bubble tag-location(frame) sequence/chain e.g. make invisible coincidences visible with focus on location frame (location frame match)→conditioner operant/bubble tag sequence/chain and action operant/bubble tag 2. View operant/bubble tag-time(frame) sequence/chain "Dynamic agenda on calendar; main situational (at home/work/on the way home/on the way to work)/local timetable with fix and flexible time windows" e.g. make invisible coincidences visible with focus on time frame (time frame match)→conditioner operant/bubble tag sequence/chain and action operant/bubble tag; 3. View operant/bubble tag-location(frame) in operant/bubble tag-time(frame) 4. View Enterprise Resource Planning (ERP): View system of inference between personal resource demand operant/bubble tag and resource-allocation operant/bubble tag of operant/bubble tag sharing level 'enterprise' e.g. make invisible coincidences visible with focus on resource allocation (warehouse match)→conditioner operant/bubble tag sequence/chain and action operant/bubble tag e.g. notification operant/bubble tag "no lamp of type xyz" e.g. for just-in-time posting, just-in-time transport sharing, just-in-time situational/coincidence support in a sharing level setting e.g. at work Screen for prosumer or service provider menu development based on operant/bubble tags)

Menu for Information Neutralization of operant/bubble tag sequence(s)/chain(s)

Measurements of services with system specific and approved measurements (user can request for measurement acceptance, but system "moderator" need to approve each measurement)

User specific dynamic agenda menu (with focus on private framework, frame or other user time frames/user location frames/user situations defined by operant/bubble tag sequences/chains); User process map/mapping (work, activities) e.g. detect flow blocker situations for seamless activity/workflow flow, "doorkeeper operant/bubble tag" identification and action operant/bubble tag implementation Service trusting (two-sided, QR-code verification, professional email)

User process map (work, activities)

User specific "offline" simulation

User specific best situational channel

Mixed Reality Screen for any coincidence with the registered user

Standard filters based on user operant/bubble tags

Overview of interactive e-study protocols

Object activity flow of different sharing levels with regard to different location "Issue specific" sharing or collaboration with a specific sharing level Proposal menu so that a user can provide new operant/bubble tags activities, services or measurements (may be approved by the service community in the sense of a service moderator)

Personal link manager menu based on operant/bubble tag circles: high level operant/bubble tags for link categorization.

Standard menu for setting up filters e.g. app channels for each device, (service contacts) based on user operant/bubble tags User specific "offline" simulation menu based on "personal knowledge tree" or "personal grid of operant/bubble tags"—to test app when user is offline Special features: Voice command-to-action/Voice-to-text Special features: Fingertip grab/screen capture with Screen-Freezing bottom and Text selection bottom and import-to-operant/bubble tag available on a window-in-window, widget and any other screen of any application.

System specific: content marketing menu

System specific: user trusting automation (Trusting cascade with X-factor verification: including QR-code-view&scan-operant/bubble tag for two-sided questions&answers/activities/relations/services, e-ID verification, transcript (Certifications/Qualifications-masters/diploma/industry registration) verification, GLN database verification, professional email verification, passport picture verification, driver license, banking account payment verification, yellow pages database verification, mobile phone number verification (mobile channel), two-sided (QR-code based) profile-operant/bubble tag sequence/chain verification, fingerprint verification, (each step with full log protocol with location stamp and timestamp and linked to an encrypted ID and private key for offline or on the 'Hyperledger Fabric' for backend function on the crypto technology, in a legally compliant way)

System specific: service/measurement approval tag
System specific: Evaluation and Trusting panel of users
System specific: admin panel menu Other situations are possible in embodiments of the present invention.

Figure 11A:
FIG. 11A-11C show a mixed reality user experience in accordance with embodiments of the present invention.
Figure 11B:
Figure 11C:
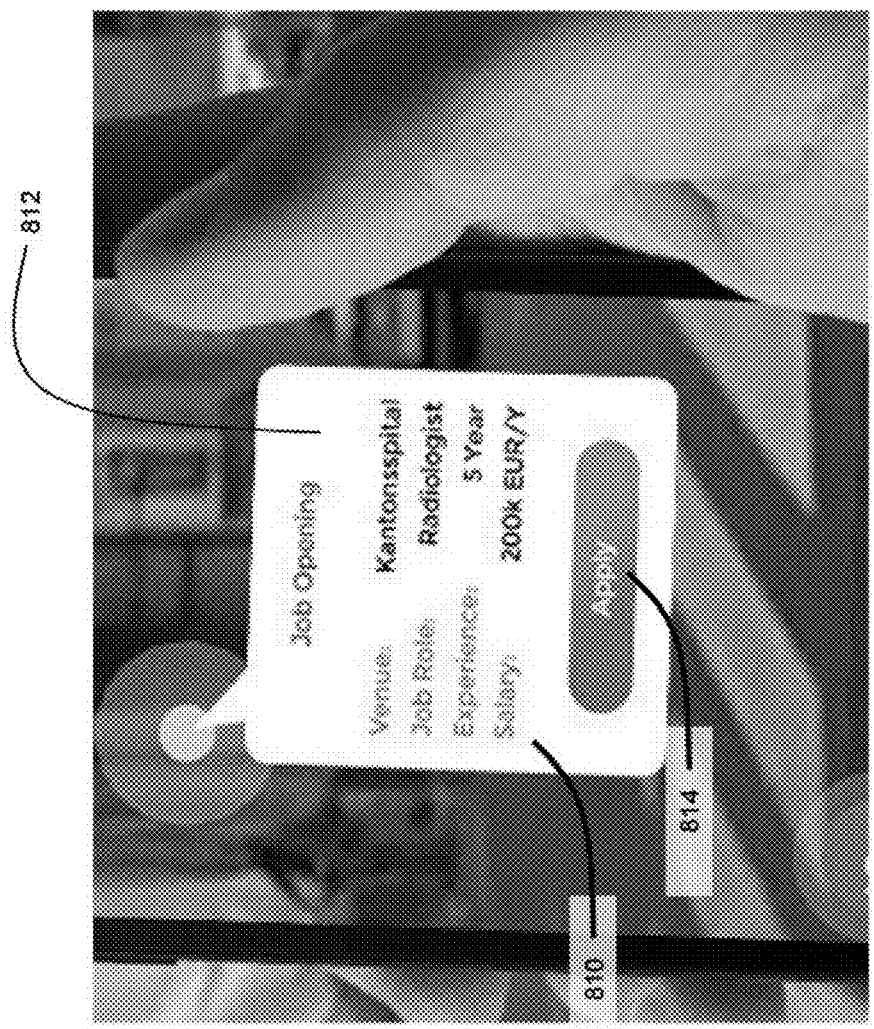

FIG. 11A-11C show a mixed reality user experience in accordance with embodiments of the present invention. Referring now to FIG. 11A, a mobile device 802 renders a live scene with virtual information points (indicated generally as 806) rendered thereon. The user can then learn more about the virtual information point by touching it, causing a corresponding notification 810 to be displayed, as shown in FIG. 11B. FIG. 11C shows additional detail of the notification 810, which includes textual information 812 pertaining to a job offer. The notification further includes a job application control 814. If the user selects the job application control 814, it can present a form for them to complete to apply for the given job. The mixed reality allows a user to identify job openings in a given neighborhood, office complex, or other suitable location. In some embodiments, the notification may include an offer for sale, purchase, and/or rental. In some embodiments, the offer can be for products and/or services. The service offers can be one-time purchases, or subscriptions.

Figure 12B:
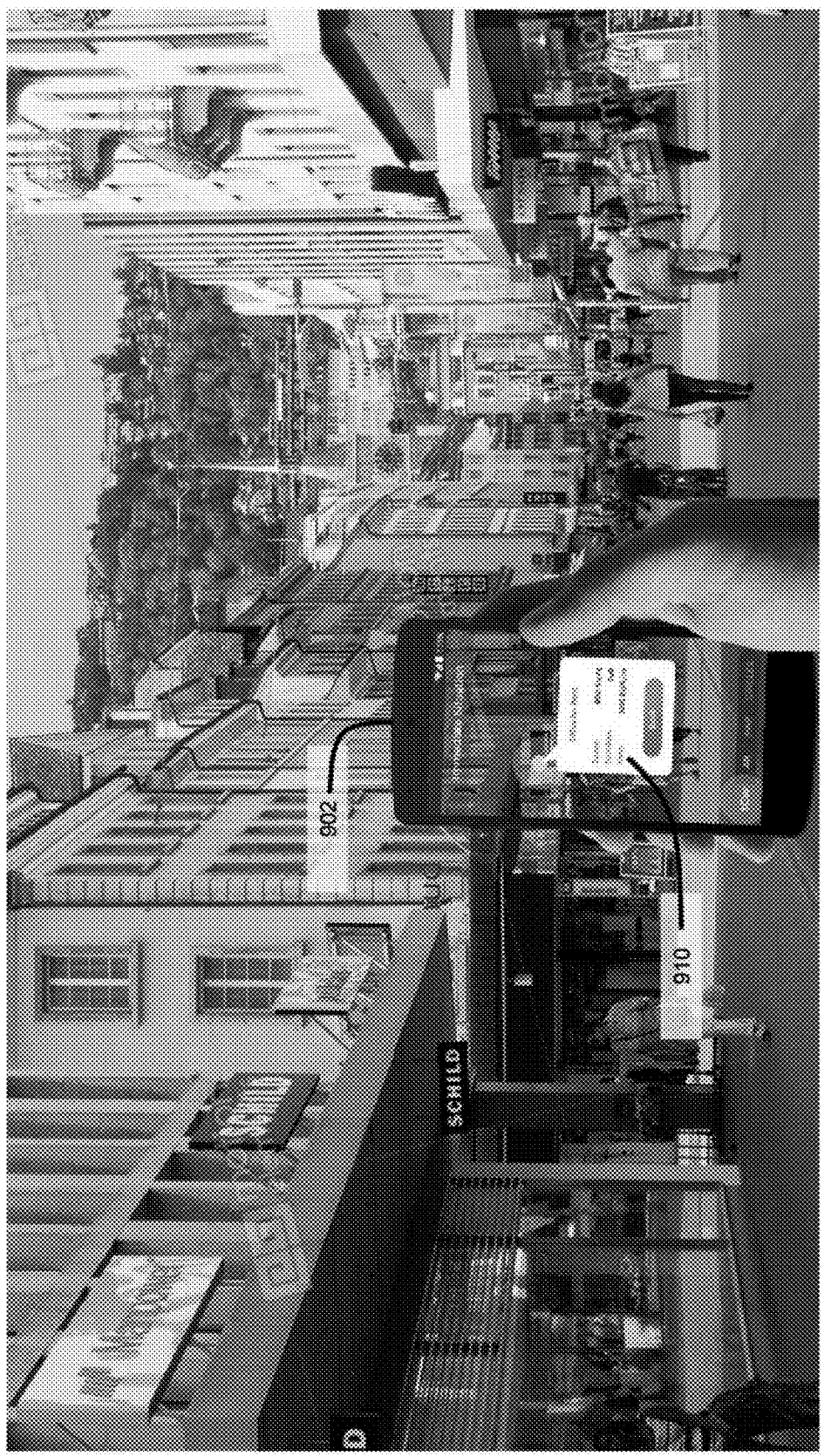
Figure 12C:
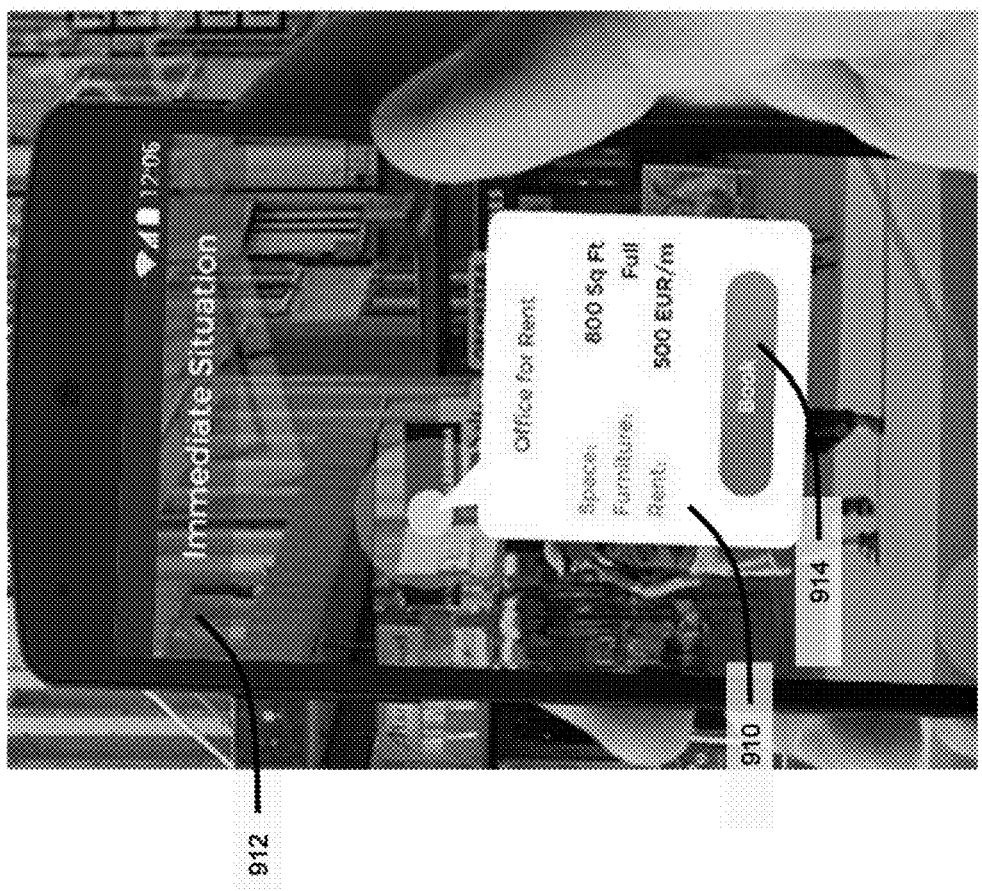

FIG. 12A-12C show another mixed reality user experience in accordance with embodiments of the present invention. Referring now to FIG. 12A, a mobile device 902 renders a live scene with virtual information points (indicated generally as 906) rendered thereon. The user can then learn more about the virtual information point by touching it, causing a corresponding notification 910 to be displayed, as shown in FIG. 12B. FIG. 12C shows additional detail of the notification 910, which includes textual information pertaining to a rental offer. The notification further includes a rental application control 914. If the user selects the rental application control 914, it can present a form for them to complete to apply for the given rental property. The mixed reality allows a user to identify available rentals in a given neighborhood, office complex, or other suitable location. Additionally, a visual notification 912 may be displayed on the user interface when virtual information points are available. Furthermore, an audio and/or vibratory alert may also be rendered when visual information points are available, thus prompting the user to view the surrounding area via mixed reality to obtain the desired information.

Figure 13A:
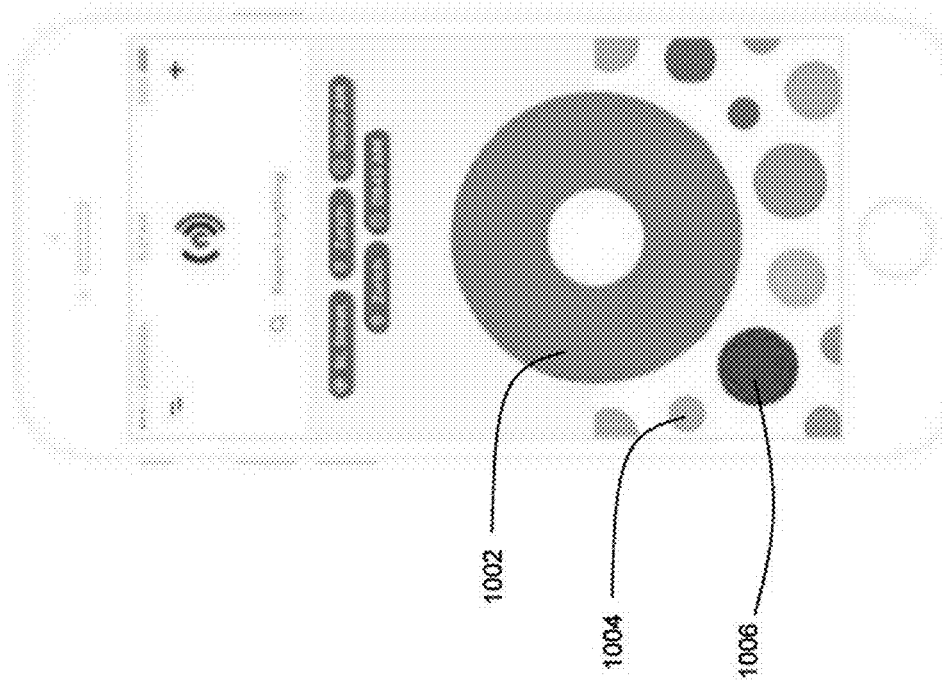
FIG. 13A-13D show a circular graphical element search user experience in accordance with embodiments of the present invention.
Figure 13B:
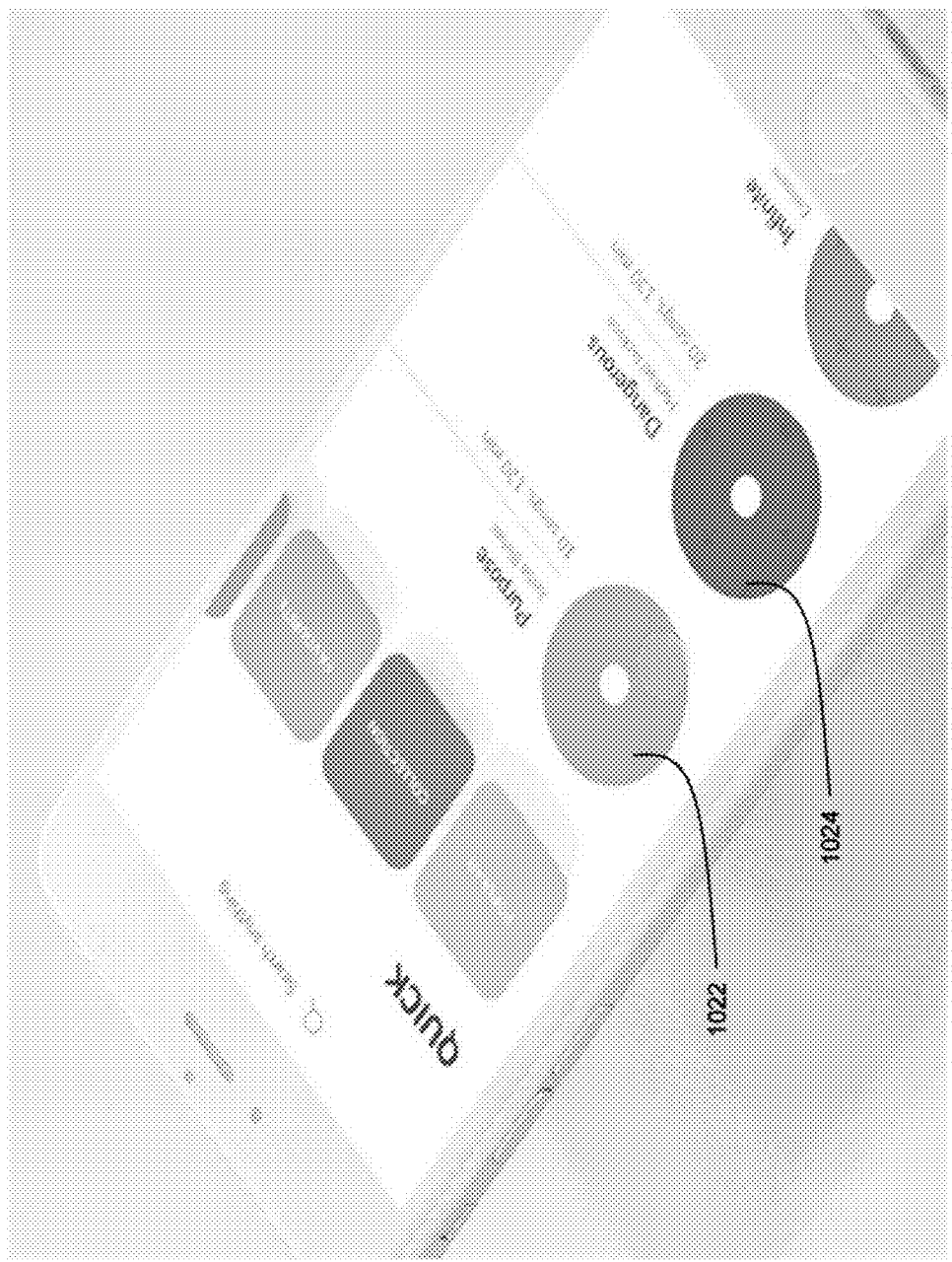
Figure 13C:
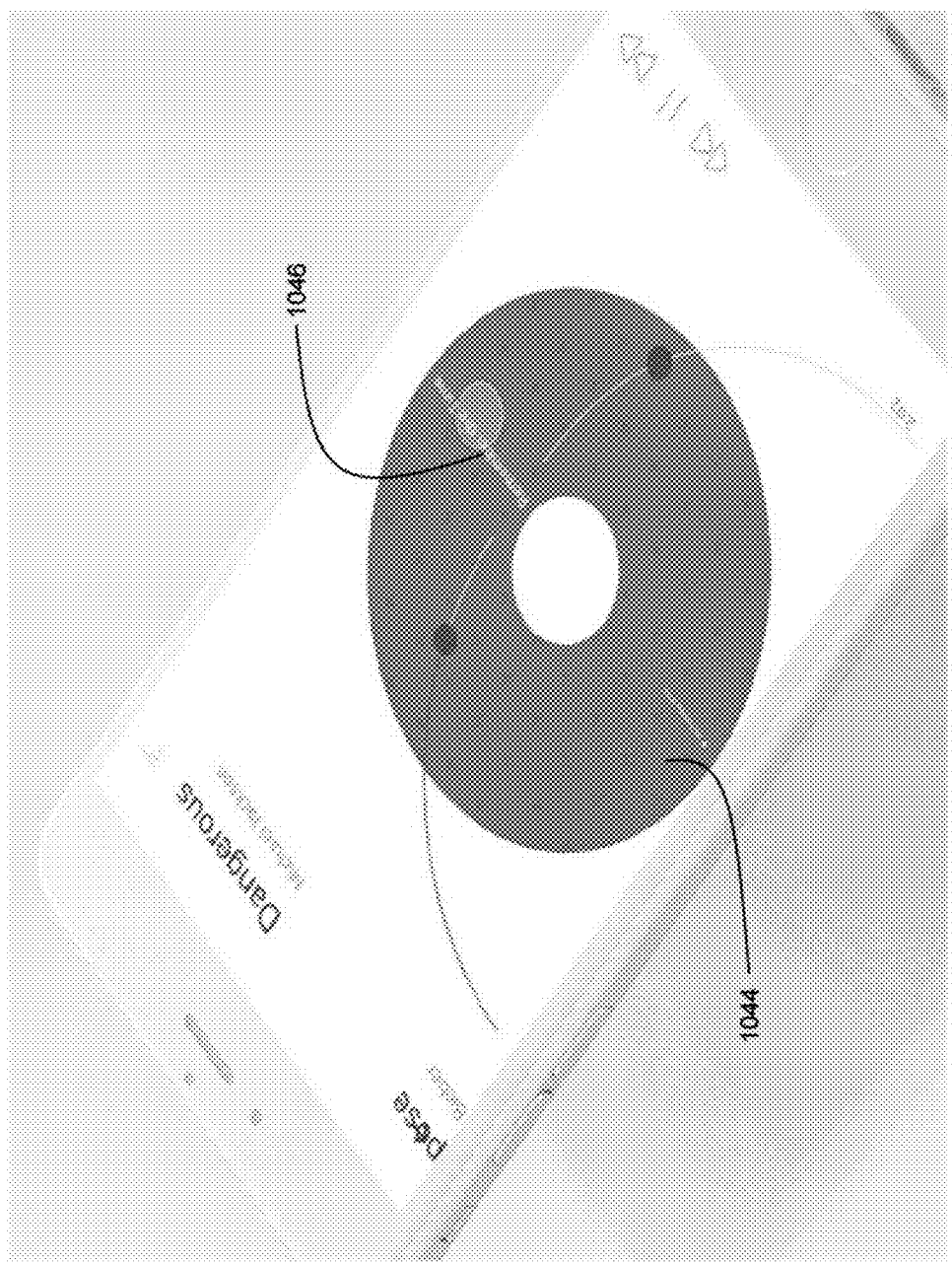
Figure 13D:
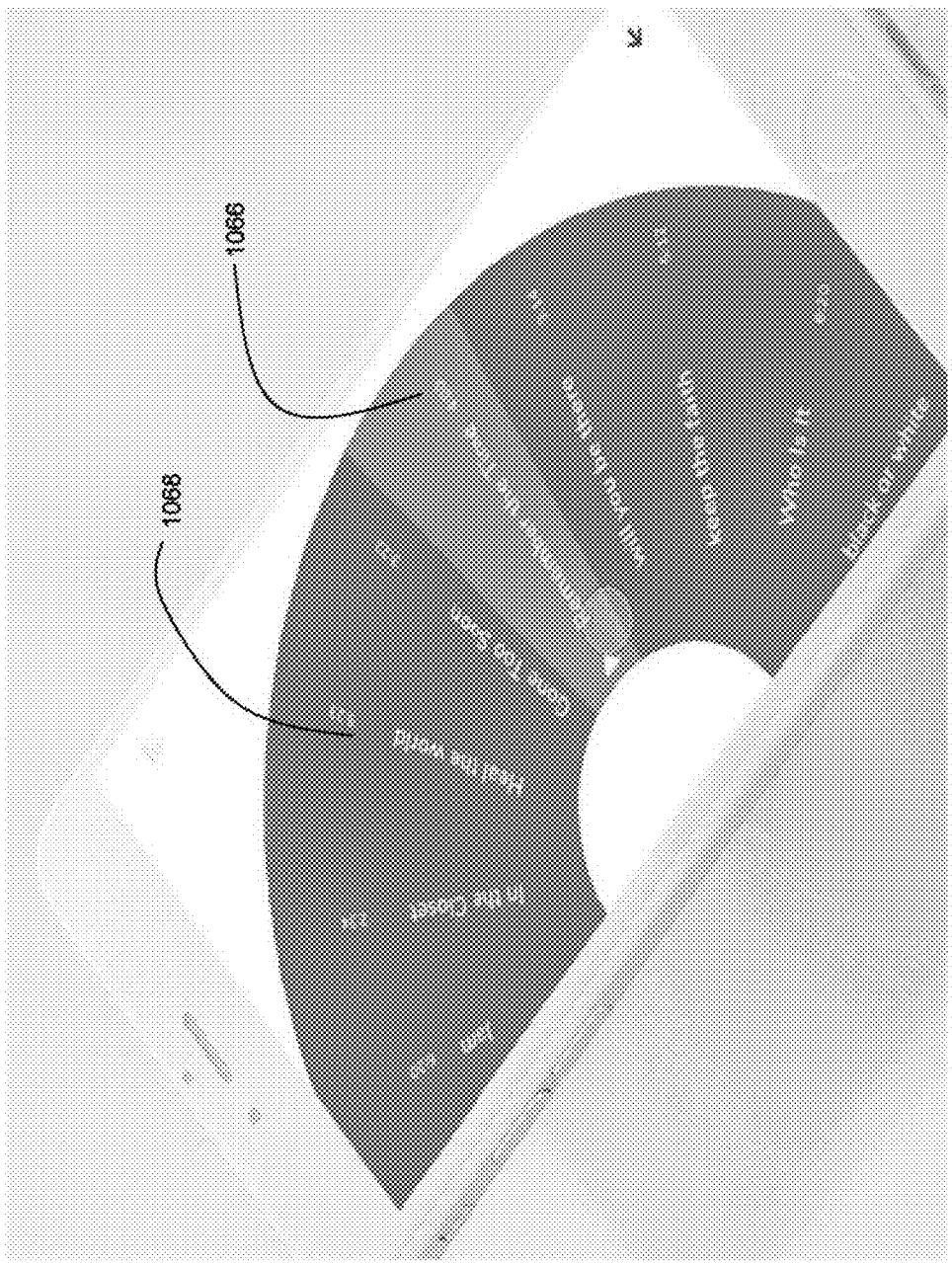

FIG. 13A-13D show a circular graphical element search user experience in accordance with embodiments of the present invention. Referring to FIG. 13A, in response to a search, a plurality of circular shaped graphical elements is rendered on user interface 1000, and some of the circular shaped graphical elements are indicated as 1002, 1004, and 1006. The circular shaped graphical elements can be ring shapes such as 1002, or solid circle shapes such as 1004 and 1006. In embodiments, the size of each circular shaped graphical element is based on relevance. Thus, in embodiments, the search result pertaining to circular shaped graphical element 1002 is more relevant than the search result pertaining to circular shaped graphical element 1006. Similarly, the search result pertaining to circular shaped graphical element 1006 is more relevant than the search result pertaining to circular shaped graphical element 1004. In some embodiments, the color and/or fill pattern may be based upon a category of a search result. As an example, a search for food may render search results that include food markets in one color, restaurants in another color, and search results including information about food regulations in another color (or fill pattern). In this way, a user can quickly assess search results and relevance using a graphical format. Furthermore, the circular shaped graphical elements can be used to further review and inspect the search results, as shown in FIGS. 13B-13D.

Referring now to FIG. 13B, a plurality of circular shaped graphical elements is shown on user interface 1020, and some of the circular shaped graphical elements are indicated as 1022, and 1024. Referring now to FIG. 13C, the user interface 1040 is shown in response to a user selecting circular shaped graphical element 1044. A current item is then shown in field 1046. Referring now to FIG. 13D, an inspection mode for the circular shaped graphical element is shown. In embodiments, the user may invoke inspection mode via a double tap or other suitable gesture while on the user interface screen shown in FIG. 13G. The user interface then progresses to FIG. 13D where multiple segments are shown, including, current item 1066 and additional text labels for additional items that are rendered in the corresponding segments. An example of a corresponding segment is indicated as 1068. This embodiment is well suited for container style objects. As an example, a music album can be considered as a container that holds multiple items (songs). In embodiments, current item 1066 represents a current playing song, while 1068 represents a related item (another song on the album). In embodiments, the user may select the related item to make it the current item. The selection mechanism can include double tapping the related item, rotating the control so the related item is in a horizontal orientation with respect to the user interface 1060, or other suitable mechanism. The user may also rotate the control as a mechanism for browsing the contents of the container (in this case, all the songs in the album). Note that while this example shows a music album, the disclosed controls can be used for a variety of digital items and corresponding metadata. Thus, in embodiments, the circular shaped graphical element, upon selection, renders a text label of a current item. In some embodiments, the circular shaped graphical element, upon selection, renders a text label of a related item in a corresponding segment.

Figure 14:
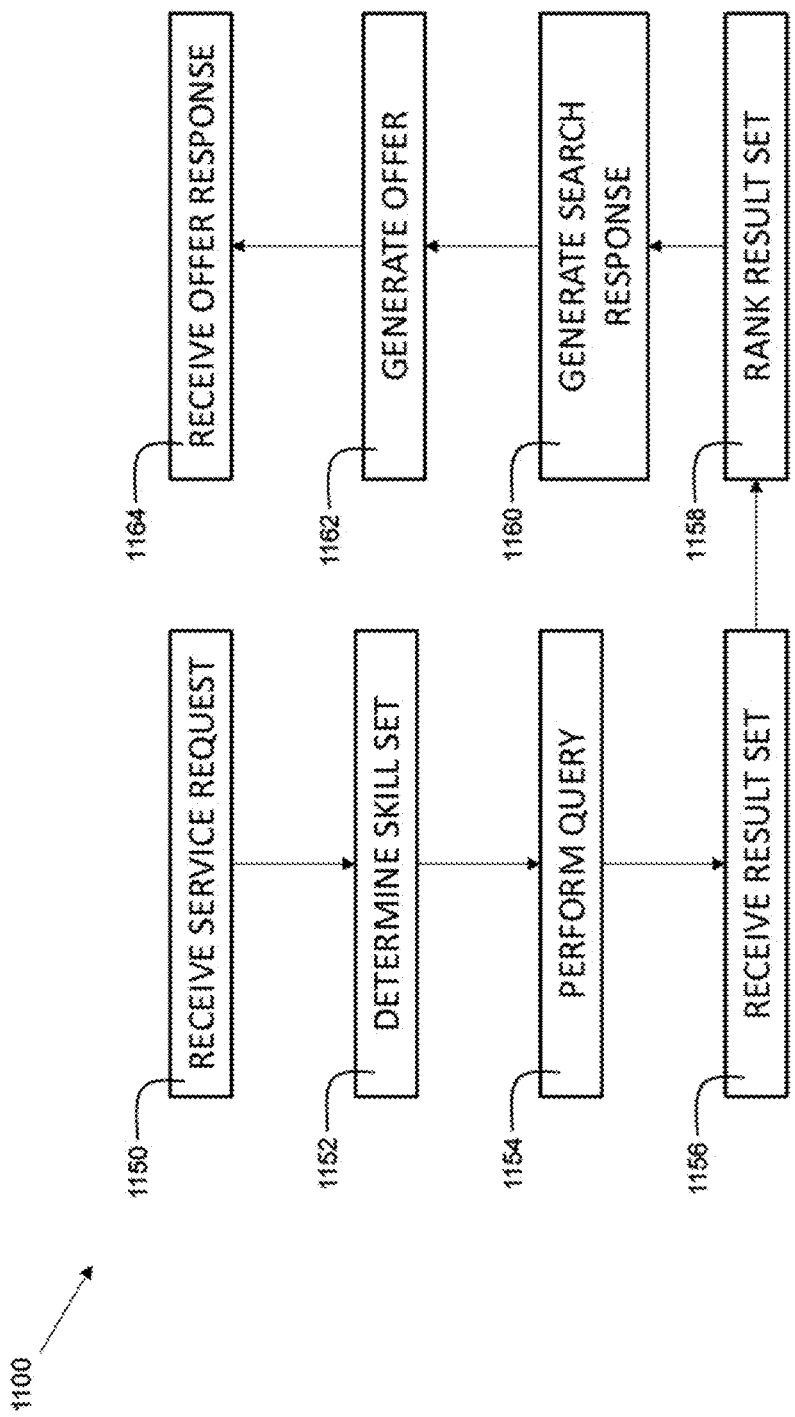
FIG. 14 is a flowchart indicating process steps for embodiments of the present invention.
Figure 15:
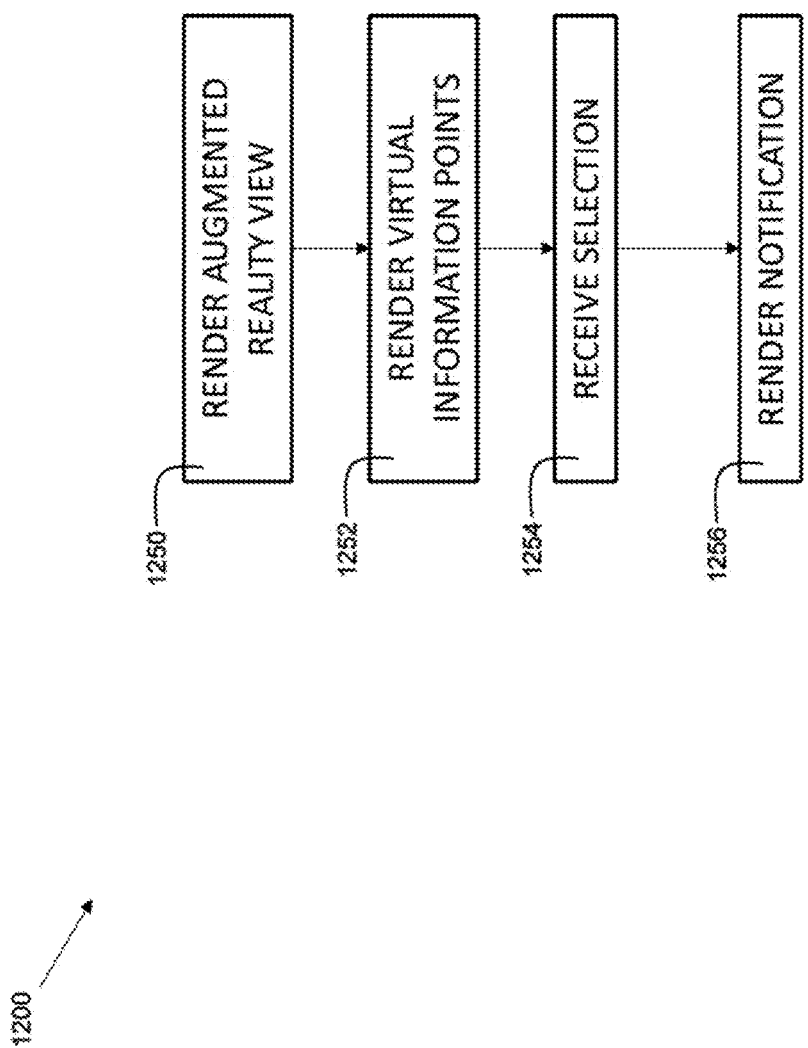
FIG. 15 is a flowchart indicating process steps for additional embodiments of the present invention.

FIG. 14 is a flowchart 1100 indicating process steps for embodiments of the present invention. At process step 1150, a service request is received (e.g. by the collaboration server). At process step 1152, a skill set is determined for the service request. This can include performing a computerized natural language analysis to extract keywords, perform disambiguation, context, and/or other processes. As an example, a service request containing phrases such as "web development" or "test" may be interpreted as elements of a desired skill set put forth by the received service request. At process step 1154 a query is performed based on the skill set. The query may search one or more professional databases, social media systems, and/or other search engines to find businesses and/or individuals that may align well with the desired skill set. At process step 1156, a result set is received from the one or more professional databases, social media systems, and/or other search engines. At process step 1158 the result set is ranked. The ranking can be performed on a variety of criteria, including, but not limited to geographic location, hourly rate, previous project and/or employment experience, number of followers on social media, number of blog posts, languages spoken, and/or education level. In process step 1160, a search response is generated, including the ranked result set, which may include one or more individuals and/or businesses that can meet the criteria and skill set from the service request. Such an example of a response is shown at 706 in FIG. 10A. At process step 1162 an offer is generated. The offer may be initiated by the same party that initiated the service request. In process step 1164 an offer response is generated. This can be initiated by the party that received the offer. In embodiments, the offer is for services of a knowledge worker, amateur, or firm.

FIG. 13 is a flowchart 1200 indicating process steps for additional embodiments of the present invention. In process step 1250, a mixed reality view is rendered in a mobile device. At process step 1252, one or more virtual information points are rendered on the mixed reality display. An example of this is shown in FIG. 11A. In embodiments, each virtual information point may be stored in the collaboration server or a connected database accessible by the collaboration server. Each virtual information point may have a plurality of data fields associated with it, including a geographic location (e.g. latitude, longitude, altitude, and/or street address). When a geolocation receiver within a mobile device identifies a current position within a predetermined distance from the location of the virtual information point, and the mobile device is oriented in the appropriate direction based on the travel path, internal compass information, and or other information, virtual information points that match a given criteria (e.g. job offers, office rentals, etc.) are rendered. In process step 1254, a selection of a virtual information point is received. In embodiments, this may be performed by a user tapping, swiping, or otherwise selecting the virtual information point. At process step 1256 a notification is rendered, providing additional information regarding the virtual information point. Examples of a rendered notification are shown in FIG. 11C and FIG. 12C.

Figure 16:
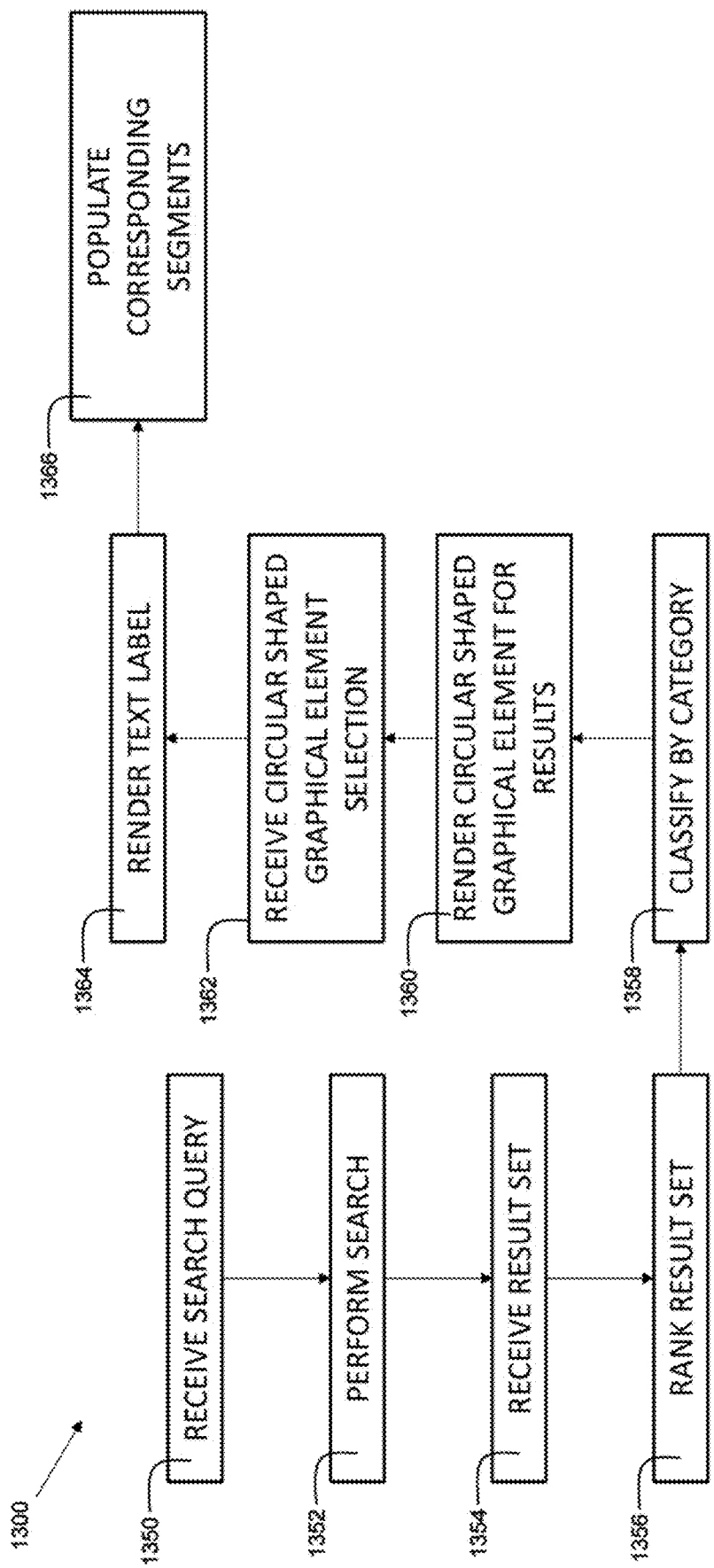
FIG. 16 is a flowchart indicating process steps for additional embodiments of the present invention.

FIG. 16 is a flowchart 1300 indicating process steps for additional embodiments of the present invention. At process step 1350, a search query is received. At process step 1352, a search is performed using one or more search engines, social media sites, and/or other suitable sources. In process step 1354, a result set is received from the search. In process step 1356, the result set is ranked based on various criteria to indicate relevance. In process step 1358, the result set items may optionally be classified by category. In process step 1360, a circular shaped graphical element is rendered for the results. Examples of this are shown in FIG. 13A-13D. In process step 1362, a circular shaped graphical element selection is received. In embodiments, this may be received by tapping, swiping, or otherwise selecting the circular shaped graphical element. In process step 1364 a text label is rendered. An example of this is shown at 1046 in FIG. 13C. In process step 1366, corresponding segments are populated with text information. An example of this is shown in FIG. 13D with 1068 indicated as one of the populated segments.

As can now be appreciated, disclosed embodiments provide improvements in collaboration via social media platforms. Embodiments can serve as an improved client, peer and industry relationship manager (CPIRM), to help individuals and companies run their business. Disclosed embodiments allow connection with peers, formation of groups, and/or inviting of users to join groups or engage in other forms of communication. Embodiments can also function as an advertising system, allowing users to promote their business, as well as promote events, engage in giveaways, competitions, and other promotions, as well as post job vacancies. Additionally, disclosed embodiments can greatly enhance productivity by allowing a mobile device to manage tasks of varying importance and problems on different platforms simultaneously with different coworkers having different backgrounds.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

Each of the above methods may be executed on one or more processors on one or more computer systems. Embodiments may include various forms of distributed computing, client/server computing, and cloud based computing. Further, it will be understood that the depicted steps or boxes contained in the disclosed flowcharts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Any and all such functions, generally referred to herein as a "circuit," "module," or "system" may be implemented by computer program instructions, by special-purpose hardware-based computer systems, by combinations of special purpose hardware and computer instructions, by combinations of general purpose hardware and computer instructions, and so on.

It will be understood that a computer may include a computer program product from a computer-readable storage medium and that this medium may be internal or external, removable and replaceable, or fixed. In addition, a computer may include a Basic Input/Output System (BIOS) firmware an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or my suitable combination of the foregoing. In the context of this document, a computer readable storage medium may be any tangible medium that can contain or store a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

It will be appreciated that computer program instructions may include computer executable code. A variety of languages for expressing computer program instructions may include without limitation C, C++, Java, JavaScript™, assembly language, Perl, Python, Django, Laravel/PHP, Ruby, Ruby on Rails 5, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Furthermore, the method steps shown are intended to include any suitable method of causing one or more parties or entities to perform the steps.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method implementing artificial intelligence (AI) and crypto technology for providing an intelligent personal assistant as a service (iPaaS), the computer-implemented method comprising:
   opening a digital application on an electronic device, the electronic device comprising a mixed reality module and a crypto module implemented via software executing on the electronic device, wherein the crypto module is configured to provide networking constructs enabling distributed redundancy with no single point of failure,
   wherein the networking constructs are selected from the group consisting of: Cwind service chains, hashgraph chains, and blockchains, and wherein each of the networking constructs are configured to:
      record and index movement of an entity to create a searchable database of every transaction; and
      store transaction data across networks of computers in a decentralized nature that constantly check and verify information with each other to make every transaction resistant to corruption or unauthorized altering of content, and
   wherein the software comprises trust levels based on a level of user-specific approval, a level of bio-identification, and a level of crypto-technology protection;
   connecting one or more third party applications with the digital application;

determining one or more tasks to be performed using the one or more third party applications, wherein the iPaaS manages hardware of the electronic device, software of the electronic device, and service agreements of the one or more third party applications to ensure security of the one or more third party applications;

creating one or more i-bubbles/i-operants, wherein each i-bubble/i-operant of the one or more i-bubbles/i-operants corresponds to at least one of the one or more tasks;

receiving, from a user, an action executed on at least one of the one or more i-bubbles/i-operants,
wherein the action is selected from the group consisting of:
importing information into the at least one of the one or more i-bubbles/i-operants, integrating at least two of the one or more i-bubbles/i-operants to form a new i-bubble/i-operant, and cutting or pasting the at least one of the one or more i-bubbles/i-operants into or from a channel,
wherein the channel is selected from the group consisting of: a social media channel, a collaboration channel, an e-commerce channel, and a supply chain service channel, and
wherein underlying infrastructure, middleware, application software, and application data of the electronic device are decentralized to save the user time and other personal resources comprising preserving a battery life of the electronic device; selecting the at least one of the one or more i-bubbles/i-operants using a graphical user interface;
running the selected at least one of the one or more i-bubbles/i-operants, using the graphical user interface, enabling control of the one or more third party applications using the digital application; and
rendering, via the mixed reality module, a display on the electronic device that comprises a mixture of real-world images and virtual objects and information superimposed on the real-world images.

2. The method as recited in claim 1, further comprising registering with the digital application.

3. The method as recited in claim 2, wherein the user can register with the digital application as: a public user; a professional user; a service provider; a company; or an institution.

4. The method as recited in claim 1, wherein creating the one or more i-bubbles/i-operants further includes submitting the one or more i-bubbles/i-operants for approval.

5. The method as recited in claim 4, further comprising, after submitting the one or more i-bubbles/i-operants for approval, adopting or rejecting the one or more i-bubbles/i-operants submitted for approval.

6. The method as recited in claim 1, further comprising communicating with one or more secondary users using the digital application.

7. The method as recited in claim 6, further comprising collaborating, using the digital application, on one or more projects with the one or more secondary users.

8. The method as recited in claim 1, further comprising requesting one or more goods or services using the digital application.

9. The method as recited in claim 8, further comprising purchasing at least one of the one or more goods or services using the digital application.

10. The method as recited in claim 1, further comprising releasing the one or more i-bubbles/i-operants for public use.

11. A computer-implemented system implementing artificial intelligence (AI) and crypto technology for providing an intelligent personal assistant, the computer-implemented system comprising:
a first electronic device, including:
a memory;
a processor;
a graphical projecting user interface;
a mixed reality module and a crypto module implemented via software executing on the electronic device, wherein the crypto module is configured to provide networking constructs enabling distributed redundancy with no single point of failure,
wherein the networking constructs are selected from the group consisting of Cwind service chains, hashgraph chains, and blockchains, and
wherein each of the networking constructs are configured to:
record and index movement of an entity to create a searchable database of every transaction; and
store transaction data across networks of computers in a decentralized nature that constantly check and verify information with each other to make every transaction resistant to corruption or unauthorized altering of content, and wherein the software comprises trust levels based on a level of user-specific approval, a level of bio-identification, and a level of crypto-technology protection;
a graphical user interface, wherein the first electronic device is configured to enable a user to:
open a digital application, wherein the digital application is run using the processor;
connect one or more third party applications with the digital application;
determine one or more tasks to be performed using the one or more third party applications;
create, using the graphical user interface, one or more i-bubbles/i-operants, wherein each i-bubble/i-operant of the one or more i-bubbles/i-operants corresponds to at least one of the one or more tasks;
receive, from the user, an action executed on at least one of the one or more i-bubbles/i-operants,
wherein the action is selected from the group consisting of: importing information into the at least one of the one or more i-bubbles/i-operants, integrating at least two of the one or more i-bubbles/i-operants to form a new i-bubble/i-operant, and cutting or pasting the at least one of the one or more i-bubbles/i-operants into or from a channel, and
wherein the channel is selected from the group consisting of: a social media channel, a collaboration channel, an e-commerce channel, and a supply chain service channel;
select the at least one of the one or more i-bubbles/i-operants using the graphical user interface;
run the selected at least one of the one or more i-bubbles/i-operants, using the graphical user interface, enabling control of the one or more third party applications using the digital application; and
render, via the mixed reality module, a display on the electronic device that comprises a mixture of real-world images and virtual objects and information superimposed on the real-world images.

12. The system as recited in claim 11, wherein the first electronic device is further configured to enable the user to register with the digital application, using the graphical user interface.

13. The system as recited in claim 12, wherein the user can register with the digital application as: a public user; a professional user; a service provider; a company; or an institution.

14. The system as recited in claim 11, wherein creating the one or more i-bubbles/i-operants further includes submitting the one or more i-bubbles/i-operants for approval.

15. The system as recited in claim 14, further comprising a second electronic device configured to enable a second user to, after submitting the one or more i-bubbles/i-operants for approval, adopt or reject the one or more i-bubbles/i-operants submitted for approval.

16. The system as recited in claim 11, further comprising one or more second electronic devices, wherein the digital application enables the user and one or more second users to communicate via the first electronic device and the one or more second electronic devices.

17. The system as recited in claim 16, wherein the first electronic device and the one or more second electronic devices are configured to enable the user and the one or more second users to collaborate, using the digital application, on one or more projects.

18. The system as recited in claim 11, wherein the first electronic device is further configured to enable the user to request one or more goods or services using the digital application.

19. The system as recited in claim 18, wherein the first electronic device is further configured to enable the user to purchase at least one of the one or more goods or services using the digital application.

20. The system as recited in claim 11, wherein the first electronic device is selected from the group consisting of: a watch; a smart phone; a desktop computer; a laptop computer; and a tablet computer.

* * * * *